US012701148B2

(12) United States Patent　　(10) Patent No.:　US 12,701,148 B2

Muñoz De La Torre Alonso et al.　　(45) Date of Patent: 　　　Aug. 4, 2026

(54) POLICY NODE, RADIO DEVICE AND METHODS IN A COMMUNICATIONS NETWORK

(71) Applicant: Telefonaktiebolaget LM Ericsson (PUBL), Stockholm (SE)

(72) Inventors: Miguel Angel Muñoz De La Torre Alonso, Madrid (ES); Marcus Ihlar, Älvsjö (SE); Attila Mihály, Dunakeszi (HU); Mirja Kuehlewind, Ludwigsburg (DE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 116 days.

(21) Appl. No.: 18/701,986

(22) PCT Filed: Oct. 21, 2021

(86) PCT No.: PCT/SE2021/051050

§ 371 (c)(1),
(2) Date: Apr. 17, 2024

(87) PCT Pub. No.: WO2023/068974

PCT Pub. Date: Apr. 27, 2023

(65) Prior Publication Data

US 2024/0414212 A1　　Dec. 12, 2024

(51) Int. Cl.
*H04L 65/1045*　　(2022.01)
*H04L 45/302*　　(2022.01)
(Continued)

(52) U.S. Cl.
CPC ........ *H04L 65/1045* (2022.05); *H04L 45/306* (2013.01); *H04L 65/1069* (2013.01); *H04W 28/0925* (2020.05)

(58) Field of Classification Search
CPC ............. H04L 45/306; H04L 65/1045; H04W 28/0925
(Continued)

(56) References Cited

U.S. PATENT DOCUMENTS

2023/0093942 A1* 　3/2023 　Koikara ................ H04L 9/3242
713/171

FOREIGN PATENT DOCUMENTS

CN 　　　115567497 A 　* 　1/2023 　........... H04L 67/141

OTHER PUBLICATIONS

Ericsson; SA WG2 Meeting #142E KI#2 Sol#14: Solution Updates; Agenda Item:8.6 (S2-2005450); Nov. 16-20, 2020.*
The CONNECT-UDP HTTP Method by D. Schinazi, Google LLC, Jan. 5, 2021; draft-ietf-masque-connect-udp-03.
(Continued)

*Primary Examiner* — Glenford J Madamba
(74) *Attorney, Agent, or Firm* — Baker Botts L.L.P.

(57) ABSTRACT

A method performed by a policy node for handling policies related to a radio device in a communications network is provided. The radio device supporting proxy server functionality. During a session establishment of the radio device, the policy node determines (602) that obtained policies related to the radio device comprises one or more rules. The respective one or more rules comprises any one or more out of: An application descriptor related to the one or more rules, and a domain descriptor related to the one or more rules. The policy node determines (605), based on received capability information, that the radio device is not aware of any or more one out of an application and a domain, and that the radio device supports proxy server functionality. The policy node handles the policies related to the radio device by activating (606) a proxy server in the radio device by sending a message to the radio device. The message comprises: An indication requesting the radio device to activate the proxy server, the one or more rules, and a configuration
(Continued)

related to the proxy server. The proxy server enables the radio device, even though not being application aware or domain aware, to apply the one or more rules comprised in the policies related to the radio device.

20 Claims, 17 Drawing Sheets

(51) Int. Cl.
  *H04L 65/1069*　　(2022.01)
  *H04W 28/08*　　(2023.01)

(58) Field of Classification Search
  USPC ........................................................ 709/224
  See application file for complete search history.

(56)　　　　　　References Cited

OTHER PUBLICATIONS

3GPP TS 23.501 v17.0.0 (Mar. 2021) 3rd Generation Partnership Project; Technical Specification Group Services and System Aspects; System architecture for the 5G System (5GS); Stage 2 (Release 17).
3GPP TS 23.548 v1.0.0 (Jun. 2021) 3rd Generation Partnership Project; Technical Specification Group Services and System Aspects; 5G System Enhancements for Edge Computing; Stage 2 (Release 17).
SA WG2 Meeting #142E, Nov. 16-20, 2020, Elbonia; Source: Ericsson; Title: KI#2, Sol#14: Solution updates; Agenda Item: 8.6 (S2-2008450).
PCT International Search Report issued for International application No. PCT/SE2021/051050—Jun. 22, 2022.
PCT Written Opinion of the International Searching Authority issued for International application No. PCT/SE2021/051050—Jun. 22, 2022.

* cited by examiner

100

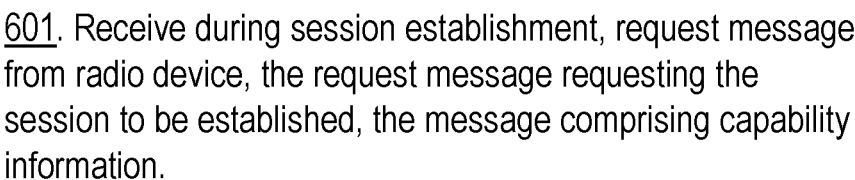

601. Receive during session establishment, request message from radio device, the request message requesting the session to be established, the message comprising capability information.

602. Determine that obtained polices related to radio device comprises one or more rules, the one or more rules comprising any one or more out of: application descriptor and domain descriptor.

603. Trigger towards radio device discovery procedure by establishing connection to radio device and sending discover request message to radio device using established connection.

604. Receive from radio device discovery response message comprising capability information.

605. Determine based on received capability information that radio device is not application and/or domain aware and that radio device supports proxy server functionality.

606. Handle policies by activating proxy server in radio device by sending message to radio device, the message requesting the radio device to activate the proxy server.

Fig. 6

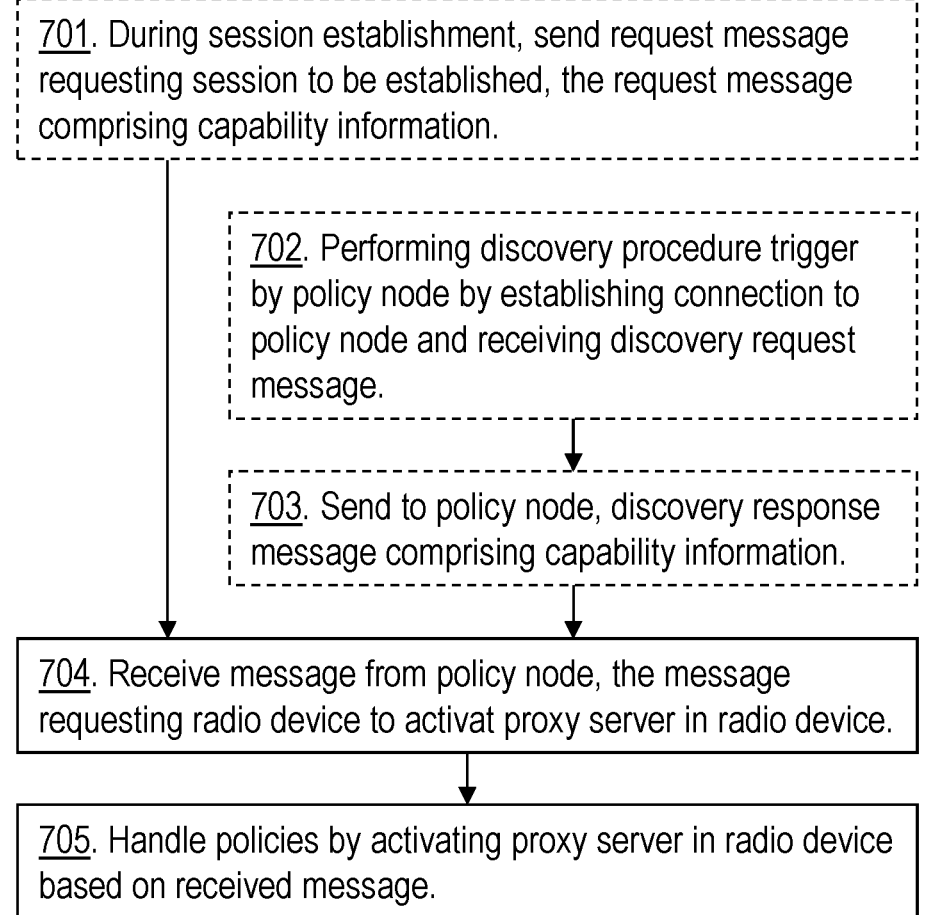

701. During session establishment, send request message requesting session to be established, the request message comprising capability information.

702. Performing discovery procedure trigger by policy node by establishing connection to policy node and receiving discovery request message.

703. Send to policy node, discovery response message comprising capability information.

704. Receive message from policy node, the message requesting radio device to activat proxy server in radio device.

705. Handle policies by activating proxy server in radio device based on received message.

Fig. 7

Computer
program 1370

Carrier
1380

Memory
1360

Processor
1350

Input/Output
Interface
1300

Radio device 120

Receiving
Unit 1310

Activating
Unit 1320

Sending Unit
1330

Performing
Unit 1340

Performing
Unit 750

Triggering
Unit 760

Predicting
Unit 770

Configuring
Unit 780

Radio device 120

Figure 18:
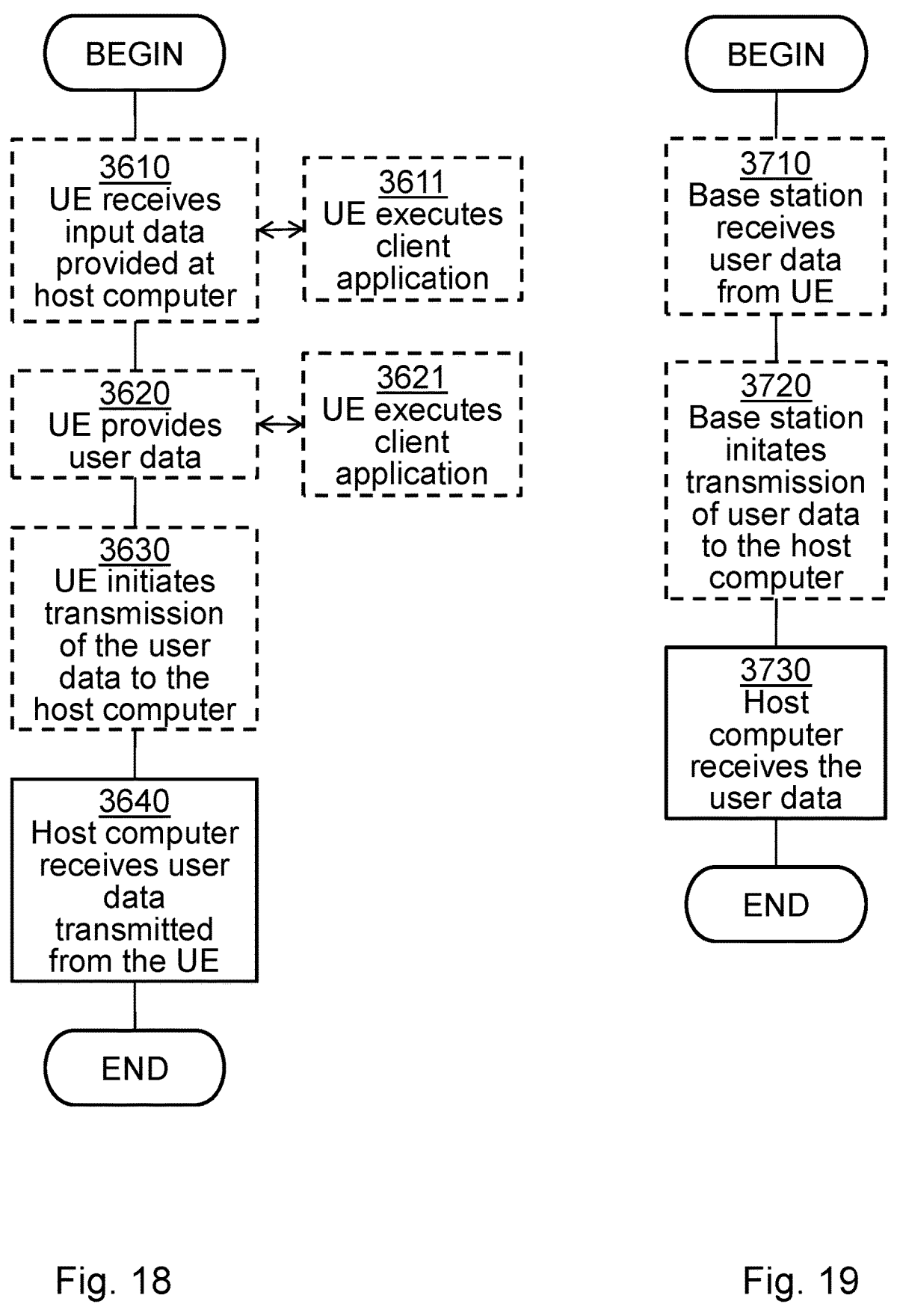

```
        ( BEGIN )                              ( BEGIN )

┌ ─ ─ ─ ─ ─ ─ ─ ┐    ┌ ─ ─ ─ ─ ─ ─ ┐   ┌ ─ ─ ─ ─ ─ ─ ┐
  │     3610      │    │    3611      │   │    3710      │
  │ UE receives   │    │ UE executes  │   │ Base station │
  │ input data    │<──>│ client       │   │ receives     │
  │ provided at   │    │ application  │   │ user data    │
  │ host computer │    └ ─ ─ ─ ─ ─ ─ ┘   │ from UE      │
  └ ─ ─ ─ ─ ─ ─ ─ ┘                       └ ─ ─ ─ ─ ─ ─ ┘

┌ ─ ─ ─ ─ ─ ─ ─ ┐    ┌ ─ ─ ─ ─ ─ ─ ┐   ┌ ─ ─ ─ ─ ─ ─ ┐
  │     3620      │    │    3621      │   │    3720      │
  │ UE provides   │<──>│ UE executes  │   │ Base station │
  │ user data     │    │ client       │   │ initates     │
  └ ─ ─ ─ ─ ─ ─ ─ ┘    │ application  │   │ transmission │
                        └ ─ ─ ─ ─ ─ ─ ┘   │ of user data │
  ┌ ─ ─ ─ ─ ─ ─ ─ ┐                       │ to the host  │
  │     3630      │                       │ computer     │
  │ UE initiates  │                       └ ─ ─ ─ ─ ─ ─ ┘
  │ transmission  │
  │ of the user   │                       ┌───────────────┐
  │ data to the   │                       │    3730       │
  │ host computer │                       │ Host          │
  └ ─ ─ ─ ─ ─ ─ ─ ┘                       │ computer      │
                                          │ receives the  │
  ┌───────────────┐                       │ user data     │
  │    3640       │                       └───────────────┘
  │ Host computer │
  │ receives user │                          (  END  )
  │ data          │
  │ transmitted   │
  │ from the UE   │
  └───────────────┘

(  END  )
```

Fig. 18                                    Fig. 19

POLICY NODE, RADIO DEVICE AND METHODS IN A COMMUNICATIONS NETWORK

PRIORITY

This nonprovisional application is a U.S. National Stage Filing under 35 U.S.C. § 371 of International Patent Application Serial No. PCT/SE2021/051050 filed Oct. 21, 2021 and entitled "POLICY NODE, RADIO DEVICE AND METHODS IN A COMMUNICATIONS NETWORK" which is hereby incorporated by reference in its entirety.

TECHNICAL FIELD

Embodiments herein relate to a policy node, a radio device and methods therein. In some aspects, they relate to handling policies related to the radio device in a communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Fixed Mobile Convergance (FMC) and 5G Residential Gateway (RG)

3GPP and Broadband Forum (BBF) have standardized a 5G FMC network solution which allows legacy Fixed Network RGs (FN-RG) and 5G capable RG (5G-RG) to access broadband services by means of a 5G Core (5GC), without the need of deploying a broadband network gateway (BNG) and specific fixed policy controllers.

In such solution a 5G-RG behaves as a UE device, supporting 5GC N1 procedures towards the 5G core to register and establish PDU session connectivity in a given network slice. As in a UEs case, the 5G-RG supports N1 procedures to receive UE Route Selection Policy (URSP) and Access Traffic Steering Switch and Splitting (ATSSS) rules to route fixed broadband traffic, as explained in following sections. The fixed access network integrates with existing 5GC network interfaces by means of a new network function called Access Gateway Function (AGF).

FIG. 1 depicts a 5G Fixed Mobile Convergence (FMC) integration reference architecture. The network functions shown in FIG. 1 is described below.

Policy Control Function (PCF)

The PCF supports unified policy framework to govern the network behavior. The PCF installs URSP and/or ATSSS rules in a 5G Residential Gateway (RG).

Access and Mobility Management Function (AMF)

The AMF manages UE access, e.g. when a UE is connected through different access networks, and UE mobility aspects.

Session Management Function (SMF)

The SMF supports different functionality, e.g. the SMF configures a User plane Function (UPF) to handle user plane traffic.

User Plane Function (UPF)

The UPF supports handling of user plane traffic based on rules received from SMF.

5G-RG

The 5G-RG receives URSP and/or ATSSS rules from the PCF, through the AMF, which allows RG to apply the requested policies to the user plane traffic. The 5G-RG supports N1 interface procedures towards the 5GC.

FN-RG

The FN-RG is legacy RG that is not 5G aware. It does not support N1 interface procedures towards the 5GC.

Access Gateway Function (AGW)

The AGW supports handling of N1 procedures for FN-RGs towards the 5GC.

Network Exposure Function (NEF)

The NEF supports a framework for internal and external network exposure.

Application Function (AF)

The AF provides session related information other nodes in the 5GC.

Domain Name System (DNS) and Mobile Networks

The DNS is a hierarchical and decentralized naming system for computers, services, or other resources connected to the Internet or a private network. It associates various information with domain names assigned to each of the participating entities. Most prominently, it translates more readily memorized domain names to the numerical IP addresses needed for locating and identifying computer services and devices with the underlying network protocols.

DNS is the most commonly used mechanism for application clients to discover the IP address of an Application Server (AS) in the Internet, and it is used by 3GPP to discover and/or re-discover the Edge AS. The 5GC Session establishment procedures include Information Elements (IE) for the mobile network to provide the UE with the DNS settings for a Protocol Data Unit (PDU) Session. Then the UE's Operating System (OS) includes a DNS stub resolver and APIs for the resolution of the mobile applications domain names. The DNS stub resolver is a simple DNS protocol implementation on the client side as described in Internet Engineering Taskforce (IETF) RFC1034, Section 5.3.1.

Edge Computing (EC) Architecture

Edge Computing enables operator and 3rd party services to be hosted close to the UE's access point of attachment, in order to achieve an efficient service delivery through the reduced end-to-end latency and load on the transport network.

In Edge Computing deployment, an application service may be served by multiple Edge Application Servers (EASs) typically deployed in different sites. These multiple EASs that host a service may use a single IP address, anycast address, or different IP addresses. To start an edge application service, the UE needs to know the IP address of the EAS serving the service. The UE may do a discovery to get the IP address of a suitable EAS, e.g. the closest one, so that the traffic can be locally routed to the Edge EAS. This so that the service latency, traffic routing path and user service experience can be optimized. 3GPP TS 23.548 defines a (re-) discovery procedure involving 5GC that provides a translation of the Fully Qualified Domain Name (FQDN) of an EAS into the address of an EAS as topologically close as possible to the UE using the DNS and, in parallel, also setting up the UP connectivity to the selected EAS if needed.

FIG. 2 depicts a 5G System architecture for non-roaming scenario supporting Edge Computing with Uplink (UL) Classifier/Branching Point (CL/BP). FIG. 3 depicts a 5G System architecture for non-roaming scenario supporting Edge Computing without UL CL/BP.

To support the EAS discovery procedure, an Edge Application Server Discovery Function (EASDF) is introduced that implements, e.g., the handling the DNS messages according to the instruction from the SMF, comprising:

Receiving DNS message handling rules from SMF.

Exchanging DNS messages from the UE.

Forwarding DNS messages to Compacted DNS (C-DNS) or Local DNS (L-DNS) for DNS queries.

Adding EDNS Client Subnet (ECS) option, as defined in RFC 7871, into a DNS query for an FQDN.

Notifying EASDF related information to the SMF.

Terminates the DNS security, if DNS over Transport Layer Security (DoT), DNS over Hypertext Transfer Protocol Secure (DoH) or DNS over Datagram TLS (DTLS) is used.

The EASDF has user plane connectivity with the PDU Session Anchor (PSA) UPF over the N6 interface for the transmission of DNS signaling exchanged with the UE. If the UE applications want to discover/access EAS, the DNS queries generated by the UE shall be sent to the EASDF as DNS resolver indicated by the SMF.

URSP Rules

To support both FMC and EC use cases, the network, e.g., the PCF, may install URSP rules in the UE or 5G-RG.

A URSP rule includes a traffic descriptor and a list of route selection descriptors. The traffic descriptor can include an application descriptor in the form of e.g. an application identifier. The table below, from 3GPP TS 23.503, shows the format of a URSP rule:

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptors | This part defines the Traffic descriptor components for the URSP rule. | Mandatory (NOTE 3) | | |
| Application descriptors | It consists of OSId and OSAppId(s) (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |

-continued

| Information name | Description | Category | PCF permitted to modify in a UE context | Scope |
|---|---|---|---|---|
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

ATSSS Rules

It is possible for the 5GC network to install multiaccess access policy rules, called ATSSS rules, for a 5G-RG, or for a UE, to steer a given traffic flow across fixed and cellular access. This allows convergent operators to support existing fixed hybrid access use cases, e.g. top up a given fixed broadband service on cellular, without the need of external Hybrid Access Gateway (HAGs) and integrating 5G-RG steering decisions with the policy management with the 5GC PCF.

An ATSSS capable 5G-RG, or UE, may establish a Multiaccess PDU session where the SMF, based on Policy and Charging Control (PCC) rules received from PCF, sends ATSSS rules to the 5G-RG to control the traffic steering, switching and splitting of the uplink traffic for different traffic flows carried in such PDU session. The table below, from 3GPP TS 23.502, shows the format of a ATSSS rule:

| Information name | Description | Category | SMF permitted to modify in a UE context | Scope |
|---|---|---|---|---|
| Rule Precedence | Determines the order the ATSSS rule is enforced in the UE. | Mandatory (NOTE 1) | Yes | PDU context |
| Traffic descriptors | This part defines the Traffic descriptor components for the ATSSS rule. | Mandatory (NOTE 2) | | |
| Application descriptors | One or more application identities that identify the application(s) generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | One or more descriptors that identify the destination of non-IP traffic, i.e. of Ethernet traffic. | Optional | Yes | PDU context |
| Access Selection Descriptor | This part defines the Access Selection Descriptor components for the ATSSS rule. | Mandatory | | |
| Steering Mode | Identifies the steering mode that should be applied for the matching traffic. | Mandatory | Yes | PDU context |
| Steering Functionality | Identifies whether the MPTCP functionlaity or the ATSSS-LL functionality should be | Optional (NOTE 5) | Yes | PDU context |

-continued

| Information name | Description | Category | SMF permitted to modify in a UE context | Scope |
|---|---|---|---|---|
| | applied for the matching traffic. | | | |

(NOTE 1):
Each ATSSS rule has a different precedence value from the other ATSSS rules.
(NOTE 2):
At least one of the Traffic Descriptor components is present.
(NOTE 3):
An application identity consists of an OSId and an OSAppId.
(NOTE 4):
An ATSSS rule cannot contain both IP descriptors and Non-IP descriptors.
(NOTE 5):
If the UE supports only one Steering Functionality, this component is omitted.

Traffic Encryption and Network Management

Traffic encryption is growing significantly in mobile networks and at the same time, the encryption mechanisms are growing in complexity. In particular, most applications today are not based on HTTP cleartext, but instead they are based on HTTPS, using TLS. Additionally, a significant part of the traffic is based on Quick User Datagram Protocol (UDP) Internet Connections (QUIC) transport, e.g. YouTube, Facebook, etc. QUIC has an encryption level that is higher than TLS. In the future, it is expected that most web apps will be based on QUIC transport.

QUIC

QUIC is a UDP based stream-multiplexed and secure transport protocol with integrity protected header and encrypted payload. Unlike the traditional transport protocol stack with Transmission Control Protocol (TCP), which resides in the operating system kernel, QUIC can easily be implemented in user space, e.g., in the application layer. As a consequence, this improves flexibility in terms of transport protocol evolution with implementation of new features, congestion control, deploy ability and adoption.

QUIC is currently undergoing standardization in the Internet Engineering Task Force (IETF). QUIC is likely to become the main transport protocol in the Internet's user plane. It is expected that most applications running today over HTTP/HTTPS will migrate to QUIC, driven by latency improvements and stronger security. Notably, compared to HTTPS, encryption in QUIC covers both the transport protocol headers as well as the payload, as opposed to TLS over TCP, e.g. HTTPS, which protects only the payload.

Proxy

Conceptionally, a proxy is an intermediary program acting as both server and client, creating or simply relaying requests on behalf of other entities. Requests are serviced internally or by passing them on, with possible translation, to other servers. There are several types of proxies, where we focus on the following:

A "transparent proxy" is a proxy that does not modify the request or response beyond what is required for proxy authentication and identification.

A "non-transparent proxy" is a proxy that modifies the request or response to provide some added service to the user agent, such as group annotation services, media type transformation, protocol reduction, or anonymity filtering.

A "reverse proxy" is basically a proxy that pretends to be the actual server, as far as any client or client proxy is concerned, but it passes on the request to the actual server that is usually sitting behind another layer of firewalls.

A "Performance Enhancement Proxy (PEP)" is used to improve the performance of protocols on network paths where native performance suffers due to characteristics of a link or subnetwork on the path.

SUMMARY

As part of developing embodiments herein a problem was identified by the inventor and will first be discussed.

A problem is that a mobile network operator does not know whether a radio device is application aware or not, leading to that a policy node installs URSP and/or ATSSS rules with application and/or domain descriptors which the radio device is unable to enforce. This may result in policies and/or rules not being enforced and which may lead to a decreased performance in a communications network.

An object of embodiments herein is to improve the performance of a communications network by a more efficient handling of policies in a communications network.

According to an aspect of embodiments herein, the object is achieved by a method performed by a policy node for handling policies related to a radio device supporting proxy server functionality:

During a session establishment of the radio device, the policy node determines that obtained policies related to the radio device comprises one or more rules. The respective one or more rules comprises any one or more out of: an application descriptor related to the one or more rules, and a domain descriptor related to the one or more rules.

The policy node determines, based on received capability information, that the radio device is not aware of any or more one out of an application and a domain, and that the radio device supports proxy server functionality.

The policy node handles the policies related to the radio device by activating a proxy server in the radio device. The proxy server is activated by sending a message to the radio device. The message comprises: an indication requesting the radio device to activate the proxy server, the one or more rules, and a configuration related to the proxy server.

The proxy server enables the radio device 120, even though not being application aware or domain aware, to apply the one or more rules comprised in the policies related to the radio device.

According to an another aspect of embodiments herein, the object is achieved by a method performed by a radio device for handling policies related to the radio device. The radio device supports proxy server functionality.

The radio device receives, from a policy node, a message. The message comprises: An indication requesting the radio device to activate the proxy server, one or more rules related to the radio device, and a configuration related to the proxy server.

The radio device handles policies related to the radio device by activating the proxy server in the radio device based on the received message. The proxy server enables the radio device, even though not being application aware or domain aware, to apply the one or more rules comprised in the policies related to the radio device.

According to an another aspect of embodiments herein, the object is achieved by a policy node configured to handle policies related to a radio device in a communications network. The radio device being adapted to support proxy server functionality. The policy node is further configured to:

During a session establishment of the radio device, determine that obtained policies adapted to be related to the radio device comprises one or more rules, wherein the respective one or more rules are adapted to comprise any one or more out of:

an application descriptor adapted to be related to the one or more rules, and a domain descriptor adapted to be related to the one or more rules, determine, based on received capability information, that the radio device is not aware of any or more one out of an application and a domain, and that the radio device supports proxy server functionality, handle the policies adapted to be related to the radio device by activating a proxy server in the radio device by sending a message to the radio device, the message being adapted to comprise:

an indication adapted to request the radio device to activate the proxy server, the one or more rules, and a configuration adapted to related to the proxy server, which proxy server is adapted to enable the radio device, even though not being application aware or domain aware, to apply the one or more rules comprised in the policies adapted to be related to the radio device.

According to an another aspect of embodiments herein, the object is achieved by a radio device configured to handle policies adapted to be related to the radio device in a communications network. The radio device being adapted to support proxy server functionality, the radio device is further configured to:

Receive, from a policy node, a message, the message being adapted to comprise:

an indication adapted to request the radio device to activate the proxy server, the one or more rules, and a configuration adapted to be related to the proxy server, handle policies related to the radio device by activating the proxy server in the radio device based on the received message, which proxy server is adapted to enable the radio device, even though not being application aware or domain aware, to apply the one or more rules comprised in the policies adapted to be related to the radio device.

Thanks to that the policy node determines that the radio device supports proxy server functionality, it is possible for the policy node to activate the proxy server in the radio device. The radio device activates the proxy server by receiving the message requesting the radio device to activate the proxy server. The message comprises the one or more rules related to the policies. By activating the proxy server and applying the one or more rules, the policies are handled. In this way, an efficient mechanism for handling policies is achieved.

Embodiments herein bring the advantage of an efficient mechanism improving the handling of policies. This is achieved by making it possible to determine that a radio device is not application and/or domain aware and supports proxy server functionality, and handling the policies by activating a proxy server in the radio device, enabling the radio device to apply one or more rules related to the policies. This leads to a more efficient handling of policies related to the wireless device, and results in an improved performance in the communications system.

BRIEF DESCRIPTION OF THE DRAWINGS

Examples of embodiments herein are described in more detail with reference to attached drawings in which:

FIG. 6 is a flowchart depicting embodiments of a method in a policy node.

FIG. 7 is a flowchart depicting embodiments of a method in a radio device.

FIGS. 16 to 19 are flowcharts illustrating methods implemented in a communication system including a host computer, a base station and a user equipment.

DETAILED DESCRIPTION

Figure 1:
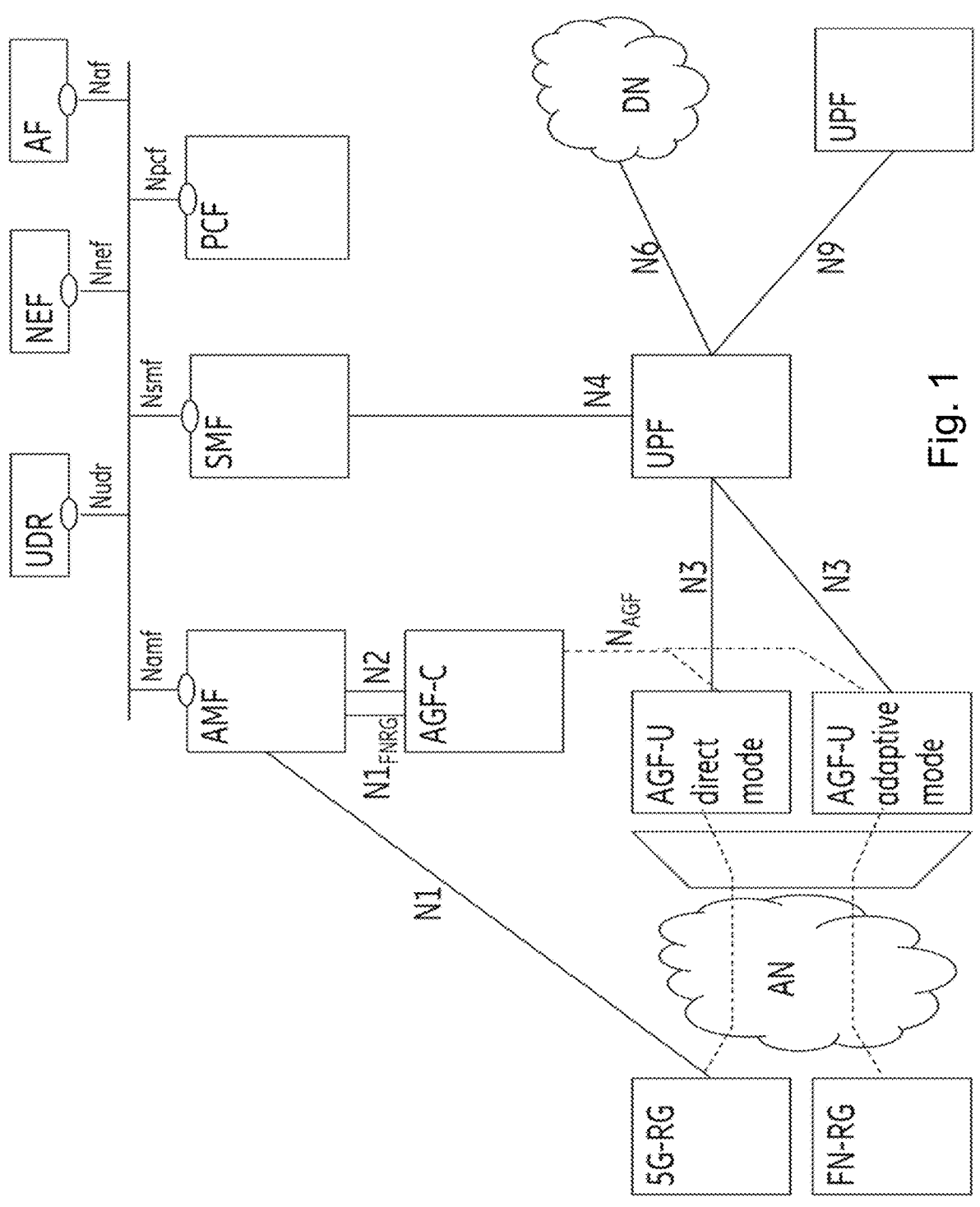
FIG. 1 is a schematic block diagram illustrating a fixed mobile convergence architecture.
Figure 2:
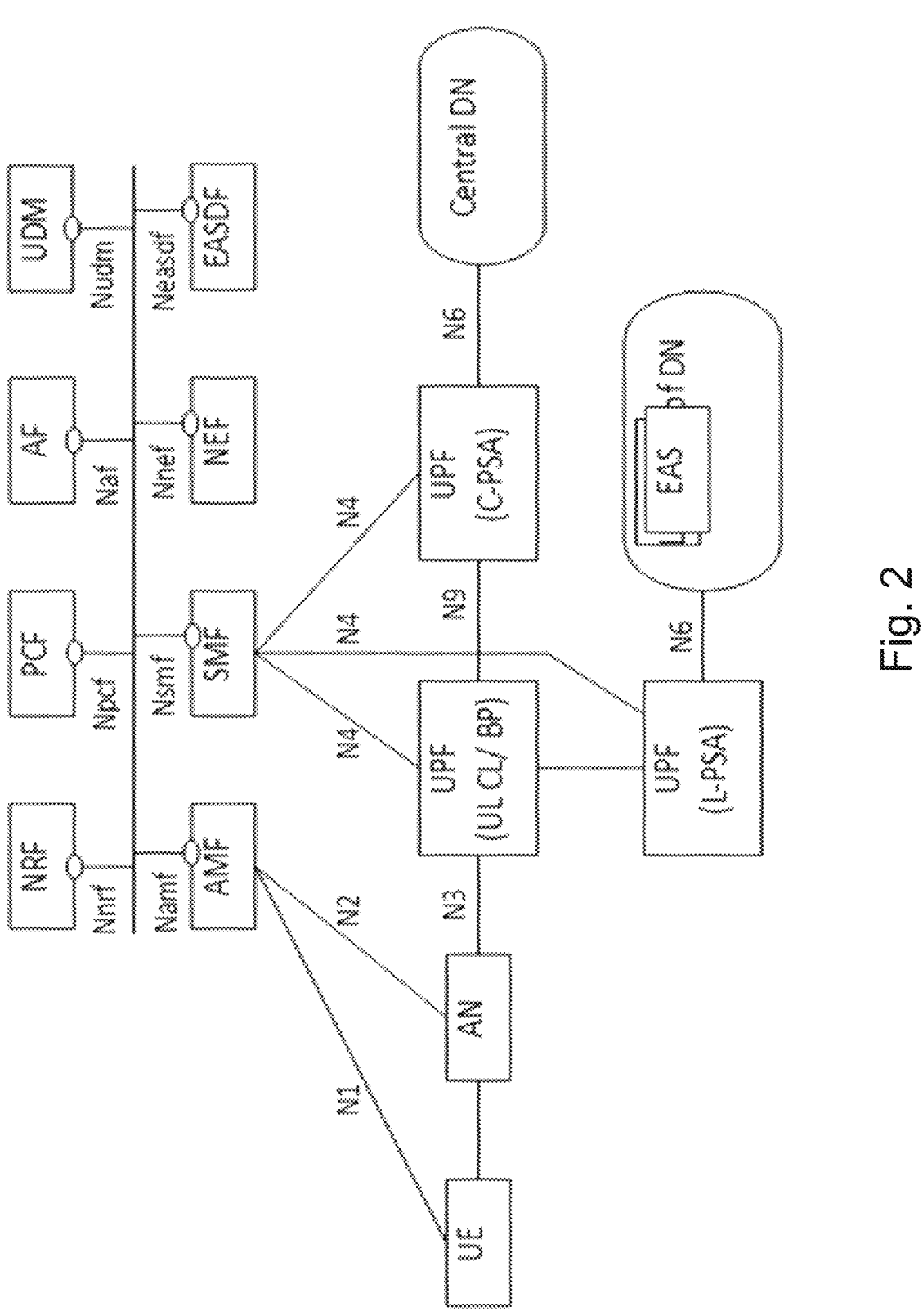
FIG. 2 is a schematic block diagram illustrating a 5G System architecture for non-roaming scenario supporting Edge Computing.
Figure 3:
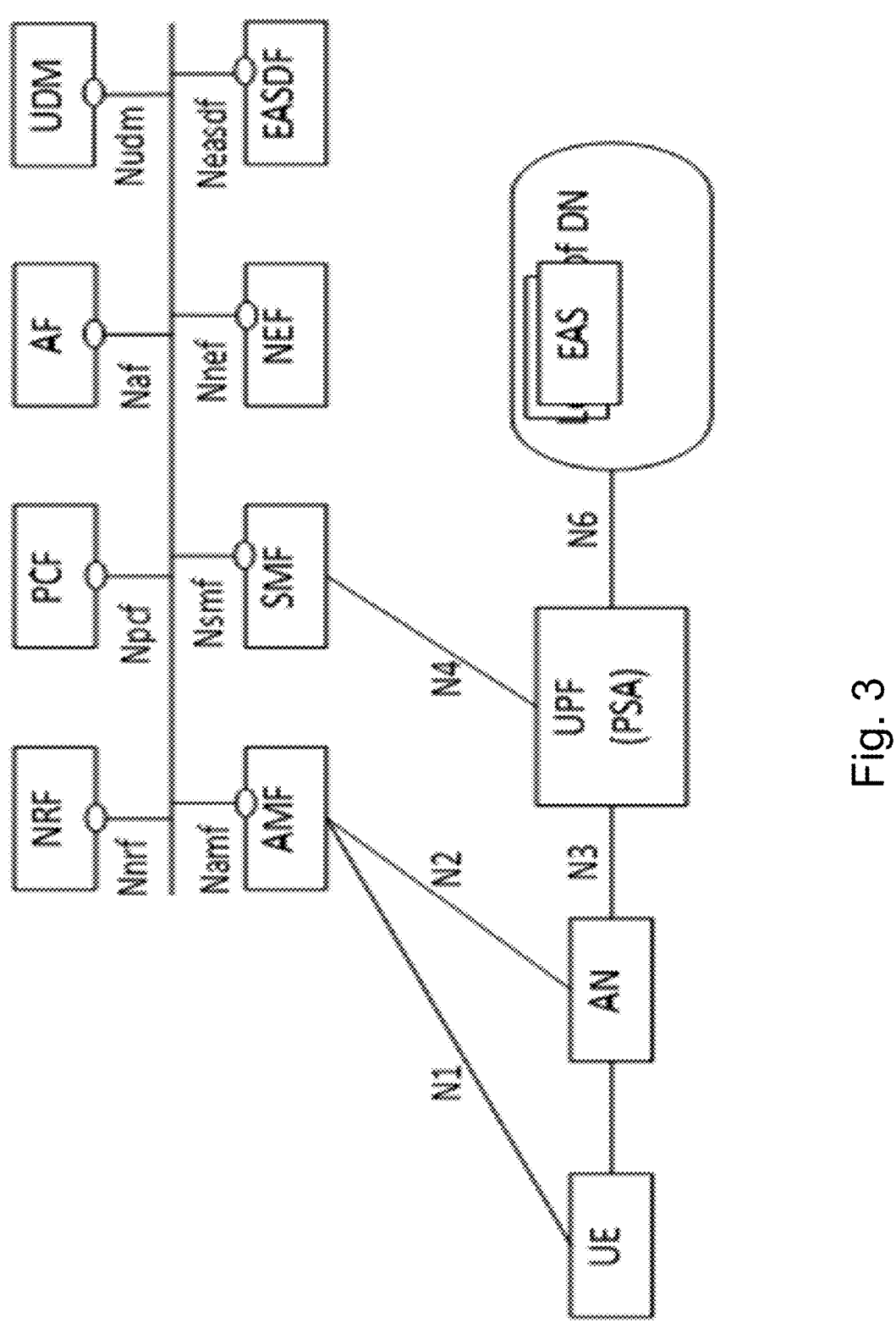
FIG. 3 is a schematic block diagram illustrating 5G System architecture for non-roaming scenario supporting Edge Computing.

As a part of developing embodiments herein a problem was identified by the inventor and will first be further discussed.

Existing standard solutions do not address the problem of applications accessing a remote UE, such as a radio device, e.g. when the radio device shares its network connection with other devices. The radio device, or remote UE, may e.g. be a 5G Residential Gateway (5G-RG) or mobile hotspot or Bluetooth/USB tethering device. A problem is how the radio device may enforce UE Route Selection Policy (URSP) and/or Application Traffic Steering Switch and Splitting (ATSSS) rules on a per application and/or domain basis in such cases. When the radio device is not application aware, and receives URSP and/or ATSSS rules and/or other policies that comprises the application identifier, the radio device will not be able to detect application's traffic nor apply the corresponding enforcement actions on a per application basis.

The above may result in a limitation of the use cases that can be achieved with existing Fixed Mobile Convergence (FMC) and Edge Computing (EC) solutions. For example, if URSP rules are not enforced, then it is not possible to route certain applications to a given slice/DNN/local PSA according to the existing SLAs. Also, for example, if ATSS rules are not enforced, then it is not possible to support some legacy hybrid access use cases with the new FMC architecture. Further, if the related Domain Name System (DNS) settings of the radio device are omitted, then it is not possible to direct the EC application's DNS queries to the Edge Application Server Discovery Function (EASDF) and thus to apply the procedure of EAS re-selection.

An object of embodiments herein is to improve the performance of a communications network by a more efficient handling of policies in a communications network.

IETF has created a new Working Group called Multiplexed Application Substrate over QUIC Encryption (MASQUE), aimed to develop mechanisms that allow configuring and concurrently running multiple proxied stream- and datagram-based flows inside an HTTPS connection. These mechanisms are collectively called MASQUE. The group will specify HTTP and/or HTTP/3 extensions of the CONNECT method to enable this functionality, e.g. CON-NECT-UDP for UDP proxying.

A COPE node or function is an entity which resides between two endpoints, usually in a client and server setup but also in a peer to peer communication setup, that use encrypted communication. The communicating parties, usually the client, explicitly contact the proxy in order to request a network-support service. This service, based on MASQUE, at a minimum always includes forwarding of the encrypted traffic to a specific server, e.g. also in cases where the server is otherwise not directly reachable. In addition, the endpoints may share traffic information with the COPE entity such that the COPE entity may execute a requested performance enhancement function to improve the Quality of Service (QOS) of the traffic as well as optimize operations within the network. Alternatively, the COPE node may also provide additional information about the network, which enables the endpoint to optimize its data transfer, e.g. use a more optimized congestion control or delay pre-fetching activities.

Usually, it is expected that a client learns about the existence of a COPE service either directly from the access network or by other communication with a peer. When a COPE node is detected, the client can open a connection to it and request a service using MASQUE. The communication with the server is realized by an inner transport connection that is encrypted end-to-end between the client and the server.

By using the above mechanisms:

Application creates a secure connection to an on-path network proxy.

Establish secure End-to-End (E2E) connection to the server via the proxy.

Application data is secured E2E and protected from unauthorized used in the network.

Content provider and Mobile Network Operator has a secure channel to exchange information about application and policy real-time.

Figure 4:
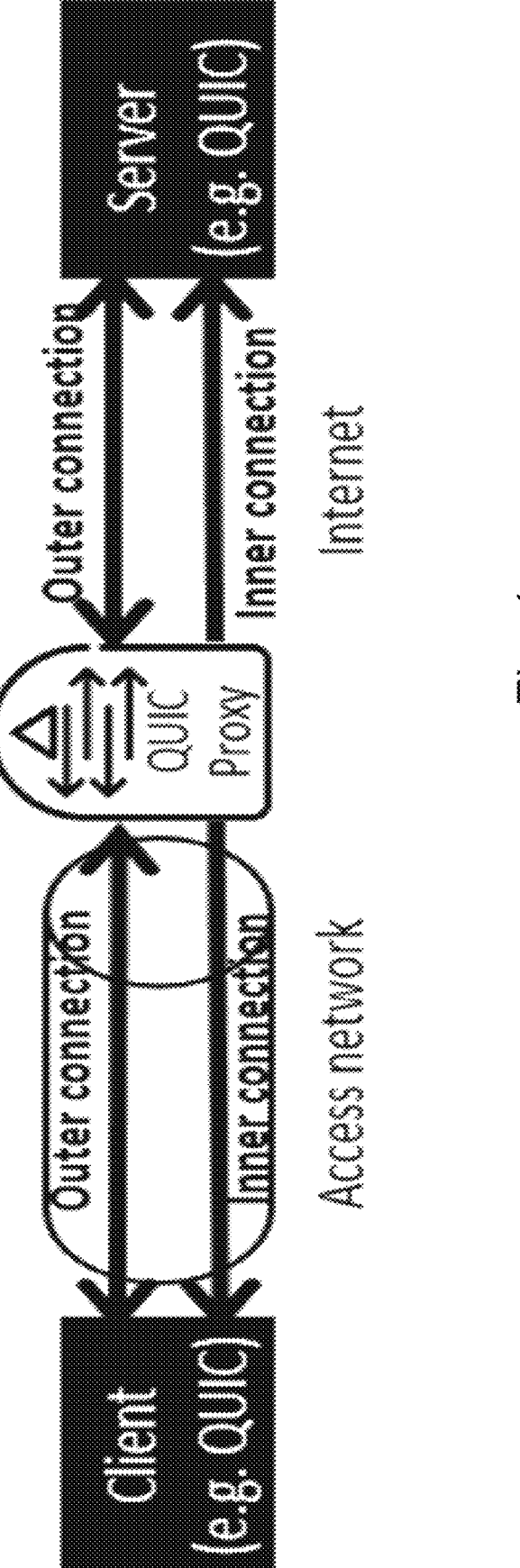
FIG. 4 is a schematic block diagram illustrating a MASQUE-based interaction.

As depicted in FIG. 4, any MASQUE-based interaction starts with the application client explicitly opening a QUIC tunnel connection to the proxy and requesting forwarding. The MASQUE/QUIC proxy provides secure forwarding but can also offer COPE services, e.g. congestion control support (mobile/satellite), access policy enforcement, load balancing/mobility, multi-hop chaining/onion routing. QUIC proxy may optionally also open a tunnel to server, if supported by server.

As such, FIG. 4 shows an inner connection which carries, e.g., encrypted, application traffic between client and server, while the outer connection can be used to expose information between the content provider, e.g., Application Client and/or Server, and the mobile network operator, e.g., a QUIC Proxy at a UPF.

Example embodiments herein provide methods that improve the handling of policies related to a radio device even though the radio device is not application and/or domain aware. This by allowing a policy node that determines the radio device is not application and/or domain aware to activate a proxy server in the radio device, enabling the policies to be handled by the radio device. By activating, and e.g. configuring, the proxy server in the radio device, the policy node activates application and/or domain awareness in the radio device. By the same mechanism, the policy node may deactivate application and/or domain awareness in the radio device by deactivating the proxy server in the radio device. This enables a dynamic activation and/or deactivating of application and/or domain awareness in the radio device, resulting in an efficient handling of policies and an improved performance of the communications network.

Further, example embodiments herein allows the radio device to handle policies on a per application and/or domain basis. This is enabled by deploying, such as e.g. activating, a proxy server at the radio device, allowing an application Identity (ID) to be exposed to the radio device in the form of a Fully Qualified Domain Name (FQDN). A client may connect to the proxy server and set up its connections through the proxy server by indicating a target Uniform Resource identifier (URI) to connect to. Based on this, the radio device may identify the application and/or domain and apply related discovery mechanisms and or policy rules.

According to example of embodiments herein the proxy server may be a MASQUE server using CONNECT-UDP or CONNECT-IP. Alternatively, the proxy server may be any HTTP proxy server using HTTP CONNECT.

Embodiments herein may e.g. bring the advantage that they enable FMC with a 5G-RG. More specifically, they allow a 5G-RG, such as e.g. the radio device, to apply policies and/or rules indicated by a Policy Control Function (PCF), such as e.g. the policy node, when the policies and/or rules are applicable on a per application basis. Further, embodiments herein brings the advantage that they enables support of EC scenarios based on e.g. URSP policies and/or rules, or based on dynamic DNS based EAS discovery or re-discovery.

Figure 5:
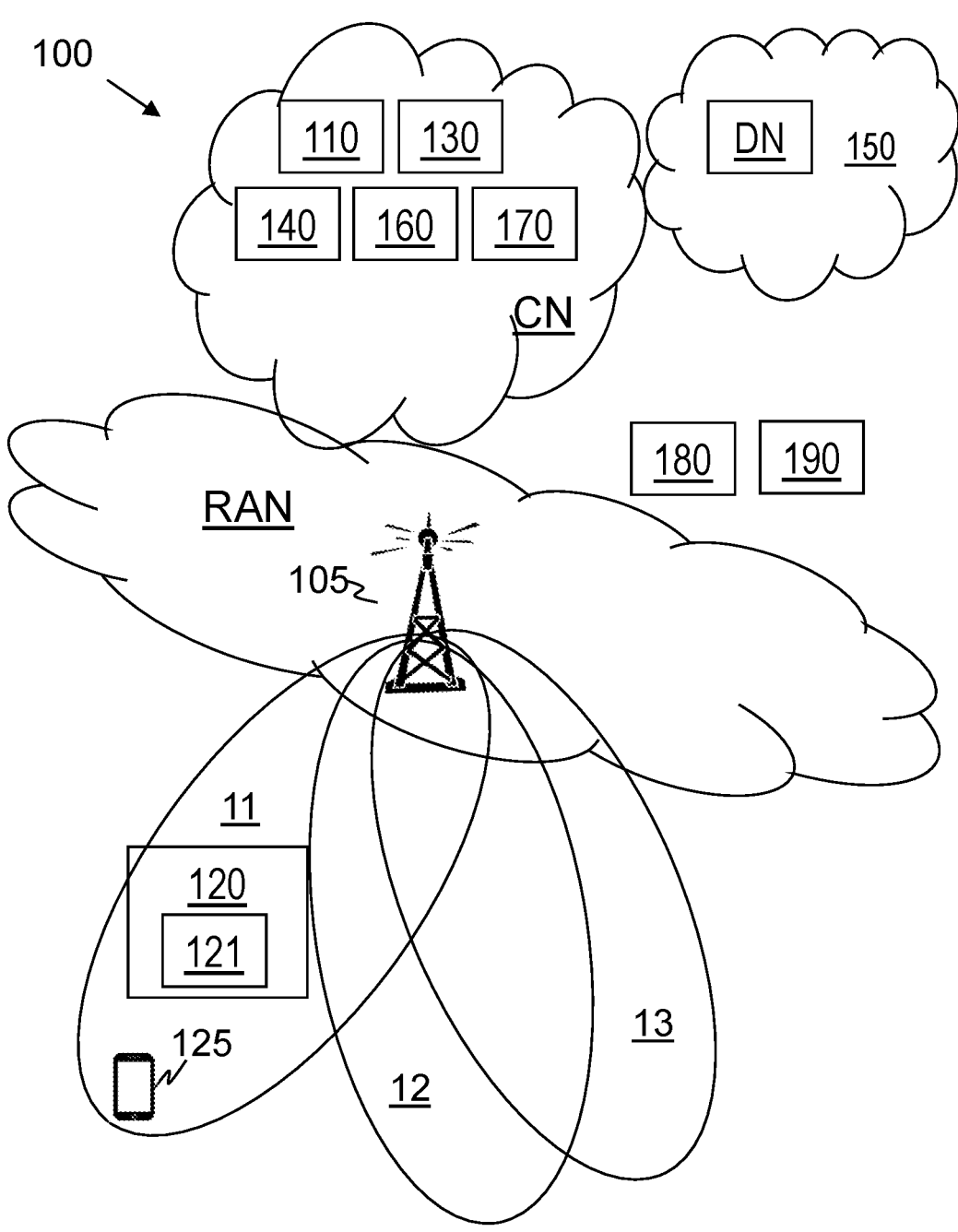
FIG. 5 is a schematic block diagram illustrating embodiments of a communications network.

FIG. 5 is a schematic overview depicting a communications network 100 wherein embodiments herein may be implemented. The communications network 100 comprises one or more RANs and one or more CNs. The communications network 100 may use 5G NR but may further use a number of other different technologies, such as, 6G, Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

One or more UEs such as e.g. radio device 120 and client device 125, operate in the communications network 100. The radio device 120 and/or radio device 120 may e.g. be 5G-RG, a remote UE, a wireless device, an NR device, a mobile station, a wireless terminal, an NB-IoT device, an MTC device, an eMTC device, a CAT-M device, a WiFi device, an LTE device and an a non-access point (non-AP) STA, a STA, that communicates via a base station such as e.g. a base station 105, one or more Access Networks (AN), e.g. a RAN, to one or more core network (CN) nodes such as e.g. a policy node 110, in one or more CNs. The radio device 120 may communicate with one or more CN nodes, such as the policy node 110, by a fixed network connection, such as e.g. cable and/or optical fiber. It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a first cell 11 provided by base station 105. The client device may communicate with other nodes in the communications network 100 via the radio device 120.

A proxy server 121 may operate in the communications network 100. E.g. the proxy server 121 may operate in a radio device, such as e.g. the radio device 120. According to example of embodiments herein the proxy server may be a MASQUE server using CONNECT-UDP or CONNECT-IP. Alternatively, the proxy server may be any HTTP proxy server using HTTP CONNECT.

Base stations such as the base station 105, operate in the communications network 100. The base station 105 provides a first cell 11, and possibly a neighbor second cell 12 and third cell 13. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with UEs such as the radio device 120, within a first cell 11, served by the base station 105 may be referred to as a serving radio network node and communicates with the radio device 120 with Downlink (DL) transmissions to the radio device 120 and Uplink (UL) transmissions from the radio device 120. The second cell 12 and third cell 13, among neighbor cells to the first cell 11, may be served by a second network node, not shown in FIG. 1, capable of communicating with UEs such as radio device 120. The first cell 11 and the second cell 12 may belong to the same tracking area and the third cell 13 may belong to different tracking area.

Among others, one or more of the following nodes operate in the CN of the communications network 100.

A user plane node 170, such as e.g. a User Plane Function (UPF) node. The user plane node 170 supports handling of user plane traffic. The user plane node 170 performs packet inspection and different enforcement actions, e.g. traffic steering, Quality of Service and/or Charging/Reporting.

A policy node 110, such as e.g. a Policy Control Function (PCF) node. The policy node 110 supports a unified policy framework to govern network behaviour. The policy node 110 provides policies and rules to e.g. the radio device 120 and/or the user plane node 170, that enforces policy and charging decisions e.g. according to provisioned rules.

A session management node 140, such as e.g. a Session Management Function (SMF) node. The session management node 140 supports different functionality, such as e.g. session establishment, modify and release, and policy related functionalities.

An access and mobility node 130, such as e.g. an Access and Mobility Function (AMF) node. The access and mobility node 130 supports different functionality, such as e.g. registration management, connection management, reachability management, mobility management and various function relating to security and access management and authorization A subscriber data node 160, such as e.g. a Unified Data Repository (UDR) node. The subscriber data node 160 supports different functionality, such as e.g. acting as a repository of subscriber information and may be used to service a number of different network functions.

Among others, one or more of the following nodes operate in the communications network 100.

A domain name server node 180, such as e.g. an DNS node. The domain name server node 180 supports different functionality, such as e.g. translating domain names to IP addresses.

A target server node 190. The target server node 190 supports different functionality, such as e.g. edge computing services and applications.

Methods according to embodiments herein are performed by the network node 110, 130 and the UE 121. These nodes may be Distributed Nodes (DN)s and functionality, e.g. comprised in a cloud 150 as shown in FIG. 5 may be used for performing or partly performing the methods.

A method according to embodiments will now be described from the view of the policy node 110 together with FIG. 6.

Example embodiments of a method performed by a method performed by the policy node 110 for handling policies related to a radio device 120 in the communications network 100 will now be described with reference to a flowchart depicted in FIG. 6. The radio device 120 supports proxy server functionality. The policy node 110 may e.g. be a Policy Control Function (PCF).

The method comprises the following actions, which actions may be taken in any suitable order. Actions that are optional are presented in dashed boxes in FIG. 6.

Action 601

In some embodiments, the policy node 110 receives a request message during a session establishment. The request message requests the session to be established. The request message comprises capability information. The session may be a Protocol Data Unit (PDU) session.

In some embodiments, the capability information indicates any one or more out of: That the radio device 120 does not support application awareness, that the radio device 120 does not support domain awareness, and that the radio device 120 supports proxy server functionality. The capability information may be related to the radio device 120. Capability information when used herein may mean one or more capabilities that e.g. the radio device 120 supports and/or not supports.

Application aware when used herein may mean that the radio device 120 is able to detect application traffic and to apply one or more corresponding enforcement actions, e.g. based on one or more rules comprised in the policies related to the radio device 120, on a per application basis. The one or more enforcement actions may e.g. comprise route selection. As described more below, the one or more rules may e.g. be URSP and/or ATSSS rules comprising one or more respective application descriptors.

Domain aware when used here may mean that the radio device 120 is able to detect the domain for traffic and to apply the corresponding enforcement actions, e.g. based on one or more rules comprised in the policies related to the radio device 120, on a per domain basis. The one or more enforcement actions may e.g. comprise route selection. As described more below, the one or more rules may e.g. be URSP and/or ATSSS rules comprising one or more respective domain descriptors.

In other words, the policy node 110 may receive the capability information as part of the message requesting the session to be established. This may be related to and combined with Actions described in relation to FIG. 9 below, where a proxy server is activated and/or configured through NAS-extensions.

Action 602

For a session between a radio device, e.g. the radio device 120, and the communications network 100, policies related to the radio device 120 controlling the session may be needed.

During the session establishment of the radio device 120, the policy node 110 determines that obtained policies related to the radio device 120 comprises one or more rules. The respective one or more rules comprises any one or more out of: an application descriptor related to the one or more rules, and a domain descriptor related to the one or more rules. The one or more rules may e.g. be UE Route Selection Policy (URSP) rules and/or Access Traffic Steering Switch and Splitting (ATSSS) rules. A URSP or an ATSSS rule may e.g. comprise a traffic descriptor and a list of route selection descriptors. The traffic descriptor may in turn comprise an application descriptor, such as e.g. an application identifier (ID) and/or a domain descriptor, such as e.g. a destination FQDN. URSP rules may allow the radio device 120 to select which route to apply for uplink traffic. ATSSS rules may allow the radio device 120 to select which access, steering mode and steering functionality to use for uplink traffic.

The policies may be obtained from a subscriber data node, such as e.g. the subscriber data node 160. The policies may be obtained as part of subscriber policy data stored in the subscriber data node 160. The policies may be one or more policies.

Action 603

A discovery procedure may enable the policy node 110 to learn about capabilities supported by the radio device 120.

In some embodiments, the policy node 110 triggers a discovery procedure towards the radio device 120. The discovery procedure is triggered by establishing a connection to the radio device 120 and sending a discovery request message to the radio device 120. The discovery request message is sent using the established connection.

A discovery procedure when used herein may mean a procedure for discovering capabilities of a radio device, e.g. the radio device 120. In other words, by triggering the discovery procedure, the policy node 110 may request capability information related to the radio device 120. The discovery request message may comprise an indication requesting the capability information.

The connection may be established to a IP address and port related to the radio device 120. The connection may e.g. be a TCP connection. The port related to the radio device 120 may e.g. be locally configured in the policy node 110.

Action 604

In response to the discovery request message the policy node 110 may receive a response from the radio device 120.

In some embodiments, the policy node 110 receives a discovery response message from the radio device 120. The discovery response message comprises the capability information. The discovery response message may be part of the triggered discovery procedure and received in response to the discovery request message.

As mentioned above, in some embodiments, the capability information indicates any one or more out of That the radio device 120 does not support application awareness, that the radio device 120 does not support domain awareness, and that the radio device 120 supports proxy server functionality. The capability information may be related to the radio device 120.

In other words, the policy node 110 may receive the capability information as part of the triggered discovery procedure. This may be related to and combined with Actions described in relation to FIG. 8 below, where proxy server is activated and/or configured on an application level.

Action 605

As mentioned above, the received capability information may indicate capabilities supported by the radio device, e.g. the radio device 120. The policy node 110 needs the capability information in order to correctly handle policies.

The policy node 110 determines, based on the received capability information, that the radio device 120 is not aware of any or more one out of application and domain. The policy node 110 further determines that the radio device 120 supports proxy server functionality based on the received capability information.

Proxy server functionality may mean that the radio device is capable of executing, such as e.g. hosting, a proxy server for handling the policies related to the radio device 120.

Action 606

The policy node 110 handles the policies related to the radio device 120 by activating a proxy server 121 in the radio device 120. The proxy server 121 is activated by sending a message to the radio device 120. The message comprises: an indication requesting the radio device 120 to activate the proxy server, the one or more rules, and a configuration related to the proxy server. The proxy server 121 enables the radio device 120, even though not being application aware or domain aware, to apply the one or more rules comprised in the policies related to the radio device 120.

In other words, by activating the proxy server 121 in the radio device 120, the policy node 110 activates application and/or domain awareness in the radio device 120. This may result in a an efficient handling of policies resulting in an improved performance of the communications network 100.

In some embodiments, the configuration related to the proxy server 121 comprises any one or more out of: certificates, and encryption keys. The certificates and/or the encryption keys are to be used by the proxy server 121. The certificates and/or encryption keys may be needed by the proxy server 121 in order to provide encryption and/or authentication.

In some embodiments, the request message to activate the proxy server 121 is any one out of: a configuration request sent directly to the radio device 120, or a policy control request message sent to the radio device 120 via the access and mobility node 130.

The proxy server 121 may e.g. be a MASQUE server. A MASQUE server when used herein may mean a proxy server, based on MASQUE mechanisms, providing e.g.

secure forwarding of data, policy and/or rule enforcement, tunneling, congestion control support, load balancing/mobility and/or multi-hop chaining/onion routing.

A method according to some embodiments will now be described from the view of the radio device 120 together with FIG. 7.

Example embodiments of the method performed by the radio device 120 for handling policies related to the radio device 120 in the communications network 100. will now be described with reference to a flowchart depicted in FIG. 6. The radio device 120 supports proxy server functionality. The radio device 120 may e.g. be referred to as a 5G-RG providing FMC functionality to other radio devices, such as e.g. other UEs or client devices connected to the radio device 120.

The method comprises the following actions, which actions may be taken in any suitable order. Actions that are optional are presented in dashed boxes in FIG. 7.

Action 701

In some embodiments, during the session establishment, the radio device 120 sends a request message requesting the session to be established. The request message comprises capability information related to the radio device 120. The request message may be received by the policy node 110.

The capability information related to the radio device 120 may indicate any one or more out of: That the radio device 120 does not support application awareness, that the radio device 120 does not support domain awareness, and that the radio device 120 supports proxy server functionality.

As mentioned above, capability information when used herein may mean one or more capabilities that e.g. the radio device 120 supports and/or not supports.

Application aware when used herein may mean that the radio device 120 is able to detect application traffic and to apply one or more corresponding enforcement actions, e.g. based on one or more rules comprised in the policies related to the radio device 120, on a per application basis. The one or more enforcement actions may e.g. comprise route selection. As described more below, the one or more rules may e.g. be URSP and/or ATSSS rules comprising one or more respective application descriptors.

Domain aware when used here may mean that the radio device 120 is able to detect the domain for traffic and to apply the corresponding enforcement actions, e.g. based on one or more rules comprised in the policies related to the radio device 120, on a per domain basis. The one or more enforcement actions may e.g. comprise route selection. As described more below, the one or more rules may e.g. be URSP and/or ATSSS rules comprising one or more respective domain descriptors.

In other words, the radio device may send the capability information as part of the message requesting the session to be established. This may be related to and combined with Actions described in relation to FIG. 9 below, where a proxy server is activated and/or configured through NAS-extensions.

Action 702

A discovery procedure may enable the policy node 110 to learn about capabilities supported by the radio device 120.

In some embodiments, the radio device 120 performs a discovery procedure triggered by the policy node 110. The discovery procedure is triggered by establishing a connection to the policy node 110 and receiving a discovery request message from the policy node 110 using the established connection. The connection may be established, such as initiated, by the policy node 110.

As mentioned above, the discovery procedure may mean a procedure for discovering capabilities of a radio device, e.g. the radio device 120. In other words, by triggering the discovery procedure, the radio device 120 be requested to provide, such as e.g. send, capability information related to the radio device 120 to the policy node 110.

The discovery request message may comprise an indication requesting the capability information.

The connection may be established to a IP address and port related to the radio device 120. The connection may e.g. be a TCP connection. The port related to the radio device 120 may e.g. be locally configured in the policy node 110.

Action 703

In response to the discovery request message the radio device may send a response from the radio device 120.

In some embodiments, the radio device 120 sends a discovery response message to the policy node 110. The discovery response message comprises the capability information related to the radio device 120.

As mentioned above, in some embodiments, the capability information related to the radio device 120 indicates any one or more out of: That the radio device 120 does not support application awareness, that the radio device 120 does not support domain awareness, and that the radio device 120 supports proxy server functionality.

In other words, the radio device 120 may provide, such as send, the capability information as part of the triggered discovery procedure to the policy node 110. This may be related to and combined with Actions described in relation to FIG. 8 below, where proxy server is activated and/or configured on an application level.

Action 704

Based on the capability information, the policy node 110 may have determined that the radio device 120 is not aware of application and/or domain and that the radio device 120 supports proxy server functionality.

The radio device 120 receives a message from the policy node 110. The message comprises: An indication requesting the radio device 120 to activate the proxy server, the one or more rules comprised in the policies, and a configuration related to the proxy server 121. The respective one or more rules may comprise any one or more out of: An application descriptor related to the one or more rules, and a domain descriptor related to the one or more rules.

The proxy server 121 may enable the radio device 120 to be application and/or domain aware, and thus be able to handle the policies related to the radio device 120.

In some embodiments, the configuration related to the proxy server comprises any one or more out of: certificates, and encryption keys. The certificates and/or the encryption keys are to be used by the proxy server 121. The certificates and/or encryption keys may be needed by the proxy server 121 in order to provide encryption and/or authentication.

In some embodiments, the request message to activate the proxy server 121 is any one out of: A configuration request received directly from the policy node 110, or a policy control request message received from the policy node 110 via the access and mobility node 130.

The proxy server 121 may e.g. be a MASQUE server. A MASQUE server when used herein may mean a proxy server based on MASQUE mechanisms, providing e.g. secure forwarding of data, policy and/or rule enforcement, tunneling, congestion control support, load balancing/mobility and/or multi-hop chaining/onion routing.

Action 705

The radio device 120 handles policies related to the radio device 120 by activating the proxy server 121 in the radio device 120 based on the received message. The proxy server 121 enables the radio device 120, even though not being application aware or domain aware, to apply the one or more rules comprised in the policies related to the radio device 120.

In other words, by activating the proxy server 121 in the radio device 120, the radio device 120 becomes application and/or domain aware. This may result in a an efficient handling of policies resulting in an improved performance of the communications network 100.

Embodiments mentioned above will now be further described and exemplified. The embodiments below is applicable to and may be combined with any suitable embodiment described above.

Example of embodiments herein enables the policy node 110 to discover, such as determine, that the radio device 120 is not aware of application and/or domain. Further, examples of embodiments herein enables the policy node 110 to discover, such as determine, that the radio device 120 supports proxy server functionality.

In some examples of embodiments herein, e.g. as described below in reference to FIGS. 8-11, proxy servers, such as e.g. the proxy server 121, is exemplified as MASQUE servers using CONNECT-UPD or CONNECT-IP. This is only considered as an example and not should not be viewed as limiting. Any HTTP proxy using HTTP CONNECT may be considered. The MASQUE protocol specifies the HTTP CONNECT-UDP method to transmit UDP data via a proxy, towards a target receiver, encapsulated in an HTTP connection. The CONNECT-UDP HTTP method requests that the recipient establish a tunnel over an HTTP stream and then 'blindly forward' UDP payload. The MASQUE protocol is mainly intended to operate on HTTP/3 which uses QUIC as the underlying transport. QUIC is an encrypted protocol that makes use of TLS which in turn makes use of PKI to authenticate endpoints. A device, such as e.g. the radio device 120, that hosts a MASQUE server, such as e.g. the proxy server 121, may need to have certificates and keying material to provide an authenticated and encrypted service.

Activation/Configuration/Deactivation of the MASQUE Server

In some examples of embodiments herein, e.g. as described below in reference to FIG. 8 and FIG. 9, a policy node, such as e.g. the policy node 110, may dynamically activate and/or deactivate application and/or domain awareness in a device, such as e.g. the radio device 120. This may be performed e.g. by activating, deactivating and/or configuring proxy server functionality in the radio device 120, such as e.g. the proxy server 121 in the radio device 120. The configuration of the proxy server 121 may comprise provisioning of private keys and certificates in the proxy server 121 server at radio device 120. In some embodiments the proxy server is MASQUE server.

Application ID Exposure Through MASQUE

In some examples of embodiments herein, e.g. as described below in reference to FIG. 10 and FIG. 11, a device, such as e.g. the radio device 120, is extended to host a proxy server that responds to CONNECT-UDP requests. In some embodiments the proxy server is MASQUE server. Any device, such as e.g. a client device 125, on the local network may expose application layer information to the radio device 120 by establishing connections to end-servers via the proxy server, e.g. the proxy server 121, hosted at the radio device 120. The client device 125 that is aware of the proxy server 121 and intends to use it, establishes a new connection to a server, such as e.g. a target server 190, via the proxy server 121 in the radio device 120. The connection is established using e.g. the CONNECT-UDP method, or similar methods for other protocols when the proxy server 121 is not a MASQUE server.

The client device 125 may provide either an IP address or a target URI in the CONNECT-UDP request. Embodiments herein assumes that the client device 125 provides a target URI that consists of a host name and a port number. A proxy server, such as the proxy server 121, hosted on the radio device 120 that receives a CONNECT-UDP request, extracts the host name from the target URI and matches it to a list of application Identifiers (IDs) configured via URSP or ATSSS rules. If there is a match the radio device 120 applies the associated policy, such as e.g. route selection or ATSS steering mode, for the payload received within a tunnel associated with the CONNECT-UDP request.

Non-UDP protocols may be proxied similarly with a CONNECT-IP method, where the entire IP payload is encapsulated within an HTTP stream. In this case a new CONNECT-IP request is performed per IP 3-tuple associated with a particular application ID. TCP traffic may be proxied per connection using the HTTP CONNECT method.

In some examples of embodiments herein mechanisms in the client device 125 for connecting to the proxy server 121 in the radio device 120 providing a gateway function is provided. Also, mechanisms for requesting traffic forwarding to a server, such as e.g. the target server 190, by specifying an URI rather than IP address is provided.

In some examples of embodiments herein mechanisms for a radio device hosting a proxy server, such as e.g. the radio device 120 hosting the proxy server 121, that connects to an internal rule engine to fetch rules for the application identified and then to apply the rules for this application. Also, the radio device 120, by using the proxy server 121, may forward the received application identifier to a mobile network, such as e.g. the communications network 100, to enable corresponding rules to be applied also in the mobile network, such as e.g. in a user plane node.

Figure 8:
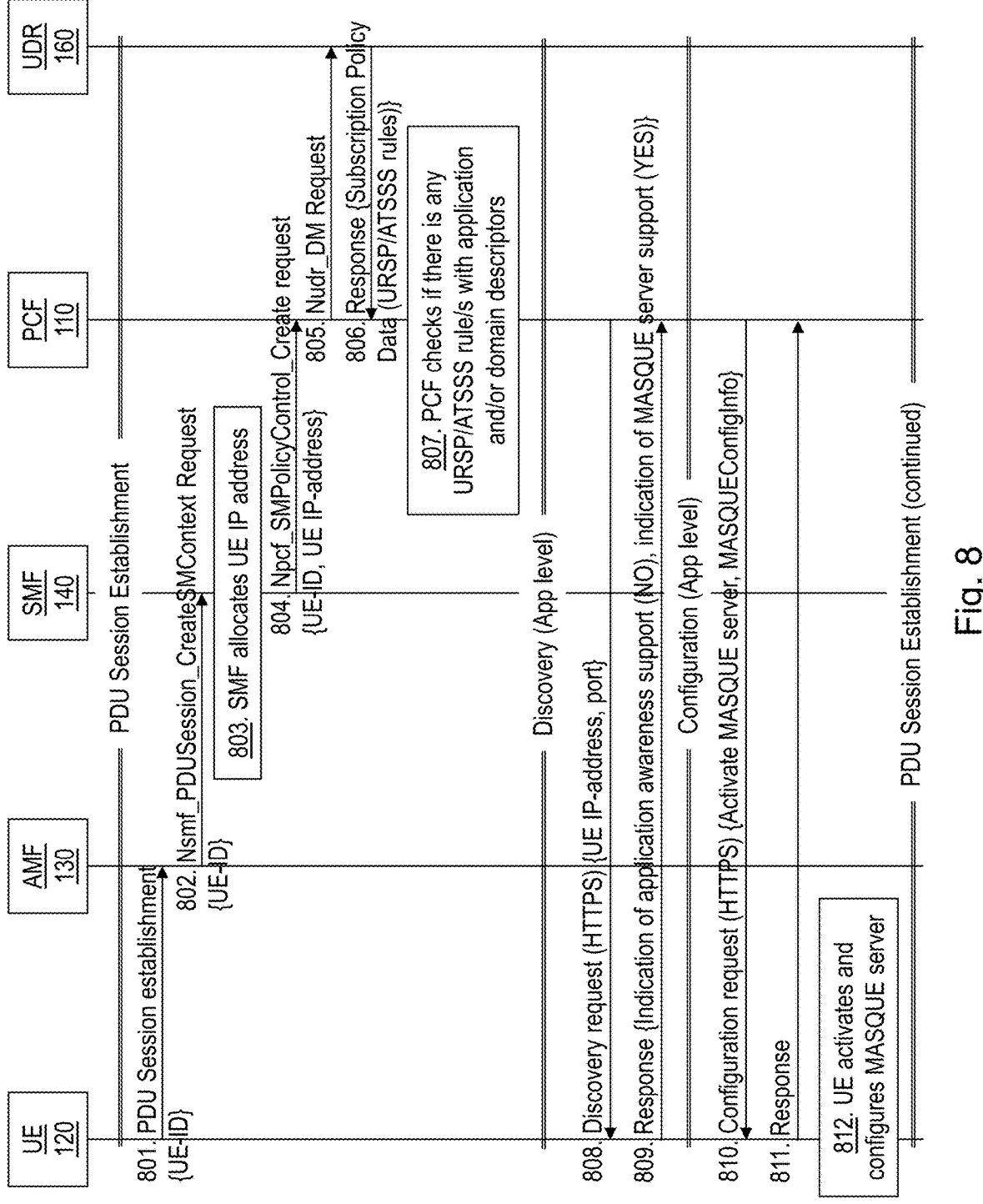
FIG. 8 is a signaling diagram depicting examples of embodiments herein.

Actions 801-812 of FIG. 8 depicts examples of detailed actions according to embodiments herein. FIG. 8 shows examples of discovery, activation and/or configuration of a proxy server in a radio device, such as the proxy server 121 in the radio device 121, at application level. In FIG. 8 the policy node 110 is referred to as PCF 110, the radio device 120 is referred to as UE 120, the access and mobility node 130 is referred to as AMF 130, the session management node 140 is referred to as SMF 140, the subscriber data node is referred to as UDR 160. The UE 120 may e.g. be a 5G-RG deployed by an MNO for providing FMC services.

The actions in the below example may be taken in any suitable order. Some steps are new according to embodiments herein and are marked so, and some are performed according to prior art.

Action 801. The UE 120, may trigger a PDU session establishment. The PDU session establishment may be triggered by sending a PDU session establishment request message to the AMF 130. The message includes a UE ID related to the UE 120.

Action 802. The AMF 130 may select an Session Management Function (SMF) instance, e.g., the SMF 140, to manage the PDU session. In some examples, an SMF selection function in the AMF 130 selects the SMF instance, such as e.g. the SMF 140, based on the available SMF instances obtained from a Network Repository Function (NRF) or SMF information configured in the AMF 130. The AMF may send a Nsmf_PDUSession_CreateSMContext Request message including the UE-ID to the SMF 140.

Note the sequence diagram in FIG. 4 does not include all the signaling messages involved in the PDU Session Establishment procedure. The relevant signaling messages for the IvD are described in subsequent steps.

Action 803. When receiving the Nsmf_PDUSession_Cre- ateSMContext Request message from the AMF 130, the SMF 140 may allocate an IP address to the UE 120.

Action 804. The SMF 140 may send an Npcf_SMPolicyControl_Create Request message towards PCF 110 comprising the UE-ID and the UE IP Address.

Action 805. When receiving the Npcf_SMPolicyControl_Create Request message from the SMF 140, the PCF may send a Nudr_DM Request message to the UDR 160. This in order to retrieve, such as obtain, subscription policy data for the PDU session of the UE 120. The subscription policy data may e.g. be the policies related to the radio device 120 described in reference to FIGS. 6 and 7.

Action 806. The UDR 160 may answer the PCF 110 with a Nudr_DM Response message comprising the subscription policy data. The subscription policy data may comprise URSP and/or ATSSS rules, such as e.g. the one or more rules described in reference to FIGS. 6 and 7. In this example, it is assumed the URSP and/or ATSSS rules include application and/or domain descriptors.

Action 807. The PCF 110 checks, such as determines, if the subscription policy data comprises any URSP and/or ATSSS rules with application and/or domain descriptors.

Action 808. If the above check holds true, e.g. the PCF 110 determines that the subscription policy data comprises one or more URSP and/or ATSSS rules with application and/or domain descriptors, the PCF 110 may trigger a discovery procedure towards the UE 120. The discovery procedure may be trigger by creating, such as establishing, e.g. TCP a connection to the UE 120 IP address and a port. The UE 120 IP address and port may be locally preconfigured at PCF 110. Once the connection is established, the PCF 110 sends a Discovery Request message towards UE 120. This actions is related to Action 603 described above.

Action 809. The UE 120 may answer the Discovery Request message by sending a Discovery Response message to the PCF 110. The discovery response message comprises the following parameters:

an indication of application awareness support.
an indication of proxy server functionality support. The proxy server may e.g. be a MASQUE server.

Action 810. When determined that the UE 120 is not application aware and that the UE 120 supports proxy server functionality, the PCF 110 activates, and configures, the proxy server, such as e.g. the proxy server 121, at UE 120. The PCF 110 activates, and configures, the proxy server, such as e.g. the proxy server 121, by sending a Configuration Request message, such as e.g. the message requesting the UE 120 to activate the proxy server, to the UE 120. The configuration request message may be sent through the connection described in Action 808 above. The configuration request message comprises the following parameters:

An indication to activate the proxy server 121, such as e.g. the MASQUE Server,
A configuration related to the proxy server 121, such as e.g., MASQUEConfigInfo when the proxy server 121 is a MASQUE server. The configuration may comprise the private keys and certificates to be used by the proxy server 121, such as e.g., the MASQUE server, at UE 120. The MASQUE protocol is mainly intended to operate on HTTP/3 which uses QUIC as the underlying transport. QUIC is an encrypted protocol that makes use of TLS which in turn makes use of PKI to authenticate endpoints. A UE, such as e.g., the UE 120, that hosts a MASQUE server, such as e.g., the proxy server 121, may need to have certificates and keying material to provide an authenticated and encrypted service.

Action 811. The UE 120 may answer the received configuration request message by sending a message to the policy node 110. The message indicates successful operation.

Action 812. The UE 120 activates and configures the proxy server 121, such as e.g., the MASQUE server, based on the received configuration message.

As an alternative, not shown in FIG. 8, the UE 120 may receive the configuration, such as e.g., the message requesting the UE 120 to activate the proxy server, from the PCF 110 via an Application Function (AF), i.e. the AF acts as an intermediary. The AF may interact with the PCF 110 and may return certificates, keys and policies to the UE 120. An advantage of this solution may be that very short-lived certificates may be used, and that the UE 120 may request new certificates upon expiry.

Figure 9:
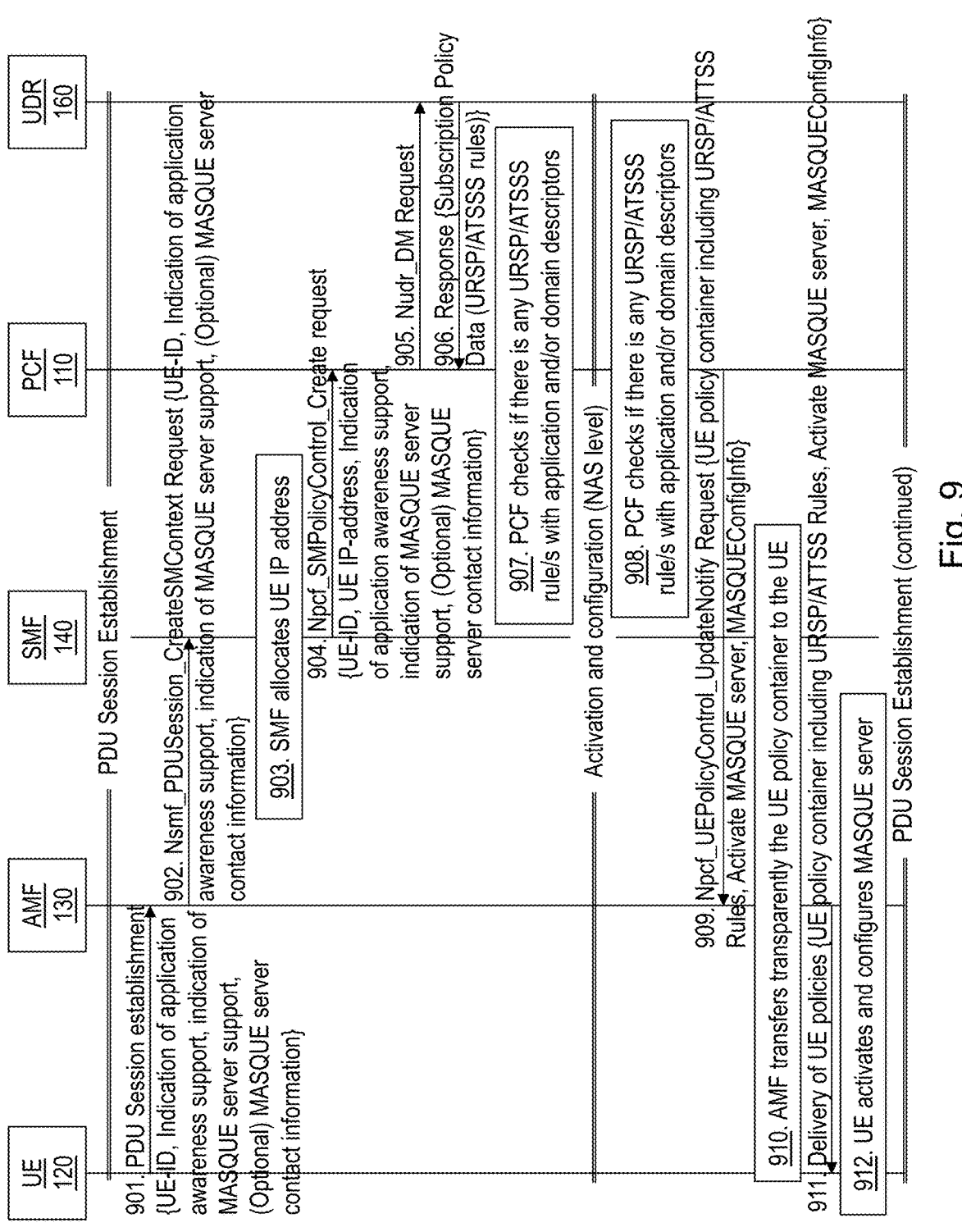
FIG. 9 is a signaling diagram depicting examples of embodiments herein.

Actions 901-912 of FIG. 9 depicts examples of detailed actions according to embodiments herein. FIG. 8 shows examples of discovery, activation and/or configuration of a proxy server in a radio device, such as the proxy server 121 in the radio device 120, through Non-Access Stratum (NAS) extensions. In FIG. 9 the policy node 110 is referred to as PCF 110, the radio device 120 is referred to as UE 120, the access and mobility node 130 is referred to as AMF 130, the session management node 140 is referred to as SMF 140, the subscriber data node is referred to as UDR 160. The UE 120 may e.g. be a 5G-RG deployed by an MNO for providing FMC services.

The actions may be taken in any suitable order.

Action 901. The UE 120, e.g., a 5G-RG, may trigger a PDU session establishment. The PDU session establishment may be triggered by sending a PDU session establishment request message to the AMF 130. The message may comprise a UE ID, e.g., a Subscription Permanent Identifier (SUPI), related to the UE 120, an indication of application awareness support an indication of proxy server functionality support. The proxy server may e.g. be a MASQUE server. The message may further comprise proxy server contact information, such as e.g., a URL and/or a port number. In some embodiments, a dynamic change of application awareness at the UE 120, e.g., by enabling or disabling a WiFi hotspot at the UE 120. The UE 120 may then trigger a PDU session modification message comprising the parameters mentioned above.

Action 902. The AMF 130 may select an SMF instance, e.g., the SMF 140, to manage the PDU session. In some examples, an SMF selection function in the AMF 130 selects the SMF instance, such as e.g. the SMF 140, based on the available SMF instances obtained from a Network Repository Function (NRF) or SMF information configured in the AMF 130. The AMF may send a Nsmf_PDUSession_CreateSMContext Request message including the UE-ID to the SMF 140.

Action 903. When receiving the Nsmf_PDUSession_CreateSMContext Request message from the AMF 130, the SMF 140 may allocate an IP address to the UE 120.

Action 904. The SMF 140 may send an Npcf_SMPolicyControl_Create Request message towards PCF 110 comprising the UE-ID and the UE IP Address.

Action 905. When receiving the Npcf_SMPolicyControl_Create Request message from the SMF 140, the PCF may send a Nudr_DM Request message to the UDR 160. This in order to retrieve, such as obtain, subscription policy data for the PDU session of the UE 120. The subscription policy data may e.g. be the policies related to the radio device 120 described in reference to FIGS. 6 and 7.

Action 906. The UDR 160 may answer the PCF 110 with a Nudr_DM Response message comprising the subscription policy data. The subscription policy data may comprise URSP and/or ATSSS rules, such as e.g. the one or more rules described in reference to FIGS. 6 and 7. In this example, it is assumed the URSP and/or ATSSS rules include application and/or domain descriptors.

Action 907. The PCF 110 checks, such as determines, if the subscription policy data comprises any URSP and/or ATSSS rules with application and/or domain descriptors.

Action 908-9. When determined that the UE 120 is not application aware and that the UE 120 supports proxy server functionality, and if the above check holds true, e.g. the PCF 110 determines that the subscription policy data comprises one or more URSP and/or ATSSS rules with application and/or domain descriptors, the PCF 110 activates, and configures, the proxy server, such as e.g. the proxy server 121, at UE 120 by triggering, e.g., sending, a Npcf_UEPolicyControl_UpdateNotify Request message, such as e.g. the message requesting the UE 120 to activate the proxy server, to the UE 120 via AMF 130. The message may be triggered over NAS. The message may comprise the following parameters:

A UE policy container comprising:
URSP and/or ATSSS rules, such as the one or more rules.
An indication to activate the proxy server 121, such as e.g. the MASQUE Server,
A configuration related to the proxy server 121, such as e.g., MASQUEConfigInfo when the proxy server 121 is a MASQUE server. The configuration may comprise the private keys and certificates to be used by the proxy server 121, such as e.g., the MASQUE server, at UE 120. The MASQUE protocol is mainly intended to operate on HTTP/3 which uses QUIC as the underlying transport. QUIC is an encrypted protocol that makes use of TLS which in turn makes use of PKI to authenticate endpoints. A UE, such as e.g., the UE 120, that hosts a MASQUE server, such as e.g., the proxy server 121, may need to have certificates and keying material to provide an authenticated and encrypted service.

Action 910-911. The AMF 130 may transparently forward the message to the UE 120.

Action 912. The UE 120 activates and configures the proxy server 121, such as e.g., the MASQUE server, based on the received configuration message.

Figure 10:
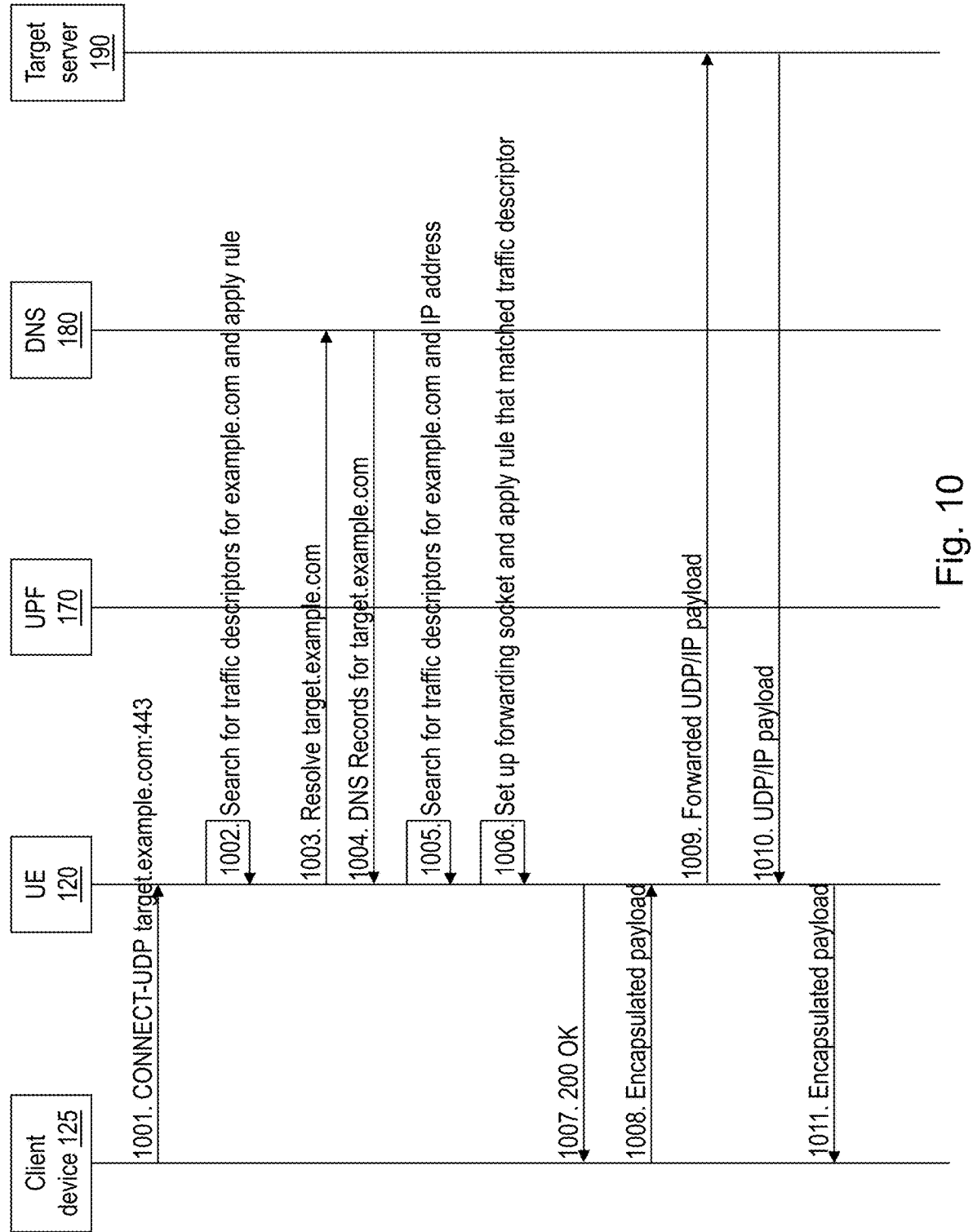
FIG. 10 is a signaling diagram depicting examples of embodiments herein.

Actions 1001-1011 of FIG. 10 depicts examples of detailed actions according to embodiments herein. In FIG. 10 the radio device 120 is referred to as UE 120, the session management node is referred to as SMF 140, the user plane node 170 is referred to as UPF 170, a domain name server node 180 is referred to as DNS 180 and a target server node 190 is referred to as target server 190.

FIG. 10 shows example of embodiments where an application ID is exposed e.g. through the proxy server 121, where the proxy server 121 may e.g. be a MASQUE sever. The UE 120 may provide a gateway function, such as thorough the proxy server 121 in the UE 120. The UE 120 may be a 5G-RG deployed by a MNO. The client device 125 may be locally configured to discover and use the proxy server 121 at the UE 120. The proxy use may be bootstrapped by arbitrary discovery mechanisms, such e.g. as static configuration, unauthenticated DHCP options, Multicast DNS or something else.

The actions may be taken in any suitable order.

Action 1001. The client device 125 may initiate a connection towards a target server, such as e.g. the target server 190. The client device 125 initiates the connection by establishing a CONNECT-UDP tunnel the proxy server 121, located at the UE 120 providing the gateway function. The target URI of the CONNECT-UDP request comprises the FQDN of the target service, e.g. target.example.com.

Action 1002. The proxy server 121 at the UE 120 may use an internal Application Programming Interface (API) to communicate the FQDN to a rule matching engine in the UE 120. For applications for which there is an agreement with the MNO for an EC service, there may be one or more of:

A URSP rule related to the PDU session attributes to use for this application, comprising e.g. the DNS queries for this application. The UE 120 may apply this rule which may result in setting up a new PDU session for this application.
An EASDF IP address configured to be used as DNS resolver for this application. This information may be received from the MNO, e.g., in the PCO field during the PDU session setup. The UE 120 may select the EASDF to send the DNS query to in Action 1003 below.

Action 1003. The UE 120 may perform a DNS query for the FQDN provided in the target URI of the CONNECT-UDP request by sending the DNS query to e.g. the DNS 180.

Action 1004. The UE 120 may receive a DNS response from the DNS 180. The DNS response may comprise mappings, which mappings maps the FQDN to one or more IP addresses.

Action 1005. The proxy server 121 server at the UE 120 may use the internal API to communicate the FQDN, IP address and the 5-tuple of the forwarding socket to the rule matching engine of the UE 120. The UE 120 may use the combination of the FQDN and the resolved IP addresses to search for matching URSP traffic descriptors or ATSSS traffic descriptors.

Action 1006. When there is a matching rule for the traffic descriptor in Action 1005, the UE 120 may apply the rule for all traffic associated with the CONNECT-UDP tunnel. This is achieved by creating an internal mapping between the traffic descriptors and the UDP 5-tuple associated with a UDP socket created by the proxy server 121.

Action 1007. The proxy server 121 may respond with a 2xx, e.g. a 200 OK, message to the client device 125 to indicate a successful CONNECT-UDP request.

Action 1008. The UE 120, e.g. the proxy server 121 in the UE 120, may receive traffic, such as payload, from the client device 125 encapsulated in a proxy tunnel. The proxy tunnel may e.g. be a MASQUE tunnel when the proxy server 121 is a MASQUE server.

Action 1009. The UE 120, e.g. the proxy server 121, may forward traffic, such as the payload, to the target server 190 using the connected UDP-socket. Any URSP or ATSSS rules that may have been applied, will apply to the traffic.

Action 1010. The UE 120, e.g. the proxy server 121, may receive incoming traffic, such as payload, from the target server 190 on the 5-tuple associated with the socket.

Action 1011. The UE 120, e.g. the proxy server 121, may forward the traffic, such as the payload, to the client device 125. The traffic may be forwarded by encapsulating the payload in the proxy tunnel.

Figure 11:
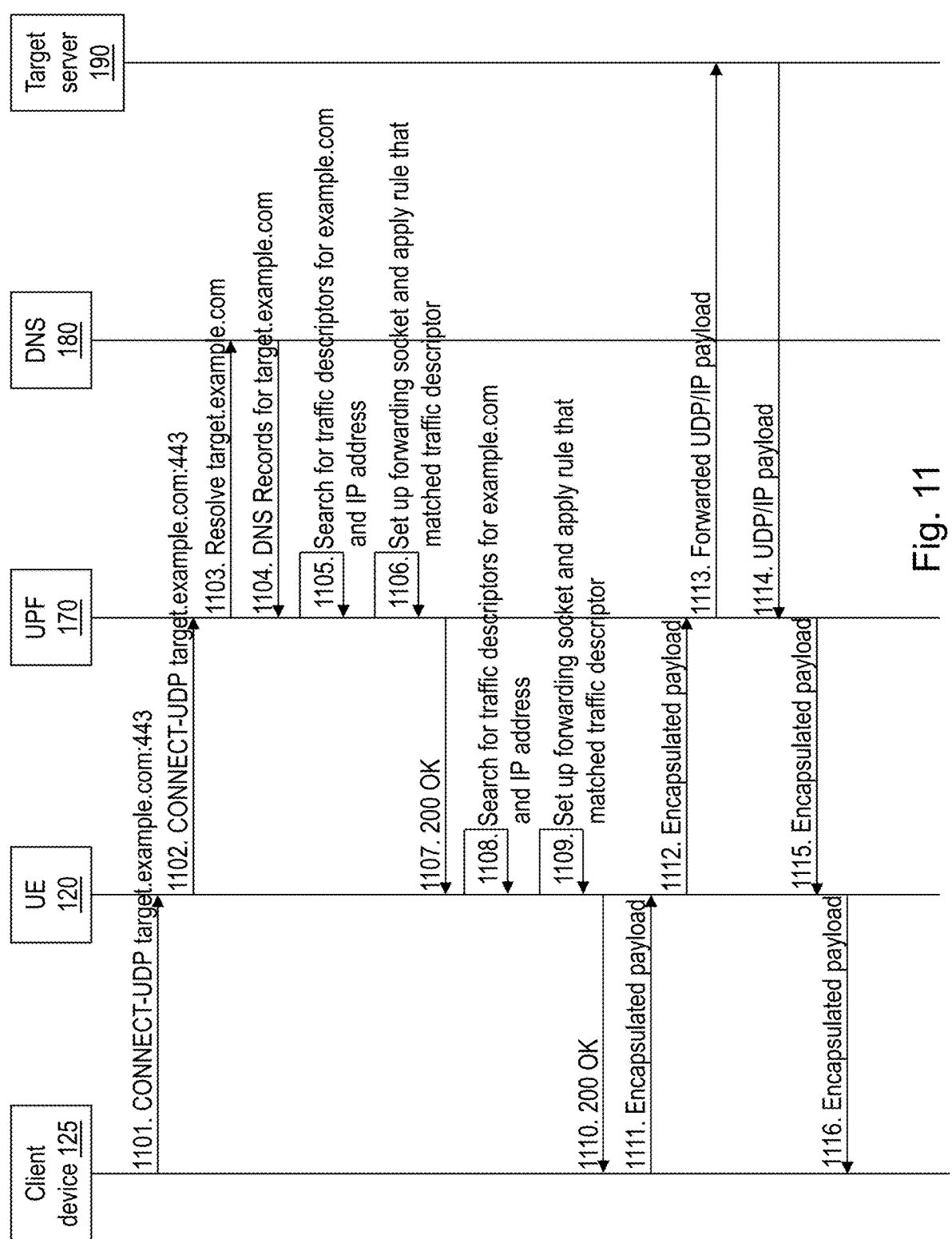
FIG. 11 is a signaling diagram depicting examples of embodiments herein.

Actions 1101-1016 of FIG. 11 depicts examples of detailed actions according to embodiments herein. In FIG. 10 the radio device 120 is referred to as UE 120, the session management node is referred to as SMF 140, the user plane node 170 is referred to as UPF 170, a domain name server node 180 is referred to as DNS 180 and a target server node 190 is referred to as target server 190.

FIG. 11 shows example of embodiments where a proxy server, e.g. the proxy server 121 in the UE 120, forwards a received application ID to a mobile network, e.g. the communications network 100, in order to enable corresponding rules to be applied in the both the proxy server 121 and the mobile network. In the example below, the application ID is forwarded to the UPF 170. The proxy server 121 may e.g. be a MASQUE sever. The UE 120 may provide a gateway function, such as thorough the proxy server 121 in the UE 120. The UE 120 may be a 5G-RG deployed by a MNO. The client device 125 may have discovered and been configured to use the proxy server 121 at the UE 120.

The actions may be taken in any suitable order.

Action 1101. The client device 125 may initiate a connection towards a target server, such as e.g. the target server 190. The client device 125 initiates the connection by establishing a CONNECT-UDP tunnel to the proxy server 121, located at the UE 120. The target URI of the CONNECT-UDP request comprises the FQDN of the target service, e.g. target.example.com.

Action 1102. The UE 120, e.g. the proxy server 121, forwards the CONNECT-UDP request to the UPF 170, such as e.g. a proxy server 171 located at the UPF 170. The proxy server 171 may e.g. be a MASQUE sever.

Action 1103. The UPF 170, e.g. a proxy server 171, may perform a DNS query for the FQDN provided in the target URI of the CONNECT-UDP request by sending the DNS query to e.g. the DNS 180.

Action 1104. The UPF 170, e.g. the proxy server 171, may receive a DNS response from the DNS 180. The DNS response may comprise mappings, which mappings maps the FQDN to one or more IP addresses.

Action 1105. The proxy server 171 at the UPF 171 may use an internal API to communicate the FQDN, IP address and the 5-tuple of the forwarding socket to a rule matching engine of the UPF 170. The UPF 170 may use the combination of the FQDN and the resolved IP addresses to search for matching URSP traffic descriptors or ATSSS traffic descriptors.

Action 1106. When there is a matching rule for the traffic descriptor in Action 1105, the UPF 170, e.g. the proxy server 171, may apply the rule for all traffic associated with the CONNECT-UDP tunnel. This is achieved by creating an internal mapping between the traffic descriptors and the UDP 5-tuple associated with a UDP socket created by the proxy server 171.

Action 1107. The UPF 170, e.g. the proxy server 171, may respond with a 2xx, e.g. a 200 OK, message to the UE 120, e.g. the proxy server 121, to indicate a successful CONNECT-UDP request.

Action 1108. The proxy server 121 at the UE 120 may use an internal API to communicate the FQDN, IP address and the 5-tuple of the forwarding socket to a rule matching engine of the UE 120. The UE 120 may use the combination of the FQDN and the resolved IP addresses to search for matching URSP traffic descriptors or ATSSS traffic descriptors.

Action 1109. When there is a matching rule for the traffic descriptor in Action 1108, the UE 120, e.g. the proxy server 121, may apply the rule for all traffic associated with the CONNECT-UDP tunnel. This is achieved by creating an internal mapping between the traffic descriptors and the UDP 5-tuple associated with a UDP socket created by the proxy server 121.

Action 1110. The UE 120, e.g. the proxy server 121, may respond with a 2xx, e.g. a 200 OK, message to the client device 125 to indicate a successful CONNECT-UDP request.

Action 1111. The UE 120, e.g. the proxy server 121 in the UE 120, may receive traffic, such as payload, from the client device 125 encapsulated in a proxy tunnel. The proxy tunnel may e.g. be a MASQUE tunnel when the proxy server 121 is a MASQUE server.

Action 1112. The UE 120, e.g. the proxy server 121, may forward the traffic, such as the payload, to the UPF 170, e.g. the proxy server 171, using the UDP socket. The traffic may be encapsulated in the proxy tunnel. The proxy tunnel may e.g. be a MASQUE tunnel when the proxy server 171 is a MASQUE server. Any URSP or ATSSS rules that may have been applied, will apply to the traffic.

Action 1113. The UPF 170, e.g. the proxy server 171, may forward the received traffic, such as the payload, to the target server 190, using the UDP socket. Any URSP or ATSSS rules that may have been applied, will apply to the traffic.

Action 1114. The UPF 170, e.g. the proxy server 171, may receive incoming traffic, such as payload, from the target server 190 on the 5-tuple associated with the socket.

Action 1115. The UPF 170, e.g. the proxy server 171, may forward the received traffic, such as the payload, to the UE 120, e.g. the proxy server 121, using the UDP socket. The traffic may be forwarded by encapsulating the payload in the proxy tunnel. Any URSP or ATSSS rules that may have been applied, will apply to the traffic.

Action 1011. The UE 120, e.g. the proxy server 121, may forward the traffic, such as the payload, to the client device 125. The traffic may be forwarded by encapsulating the payload in the proxy tunnel.

Figure 12A:
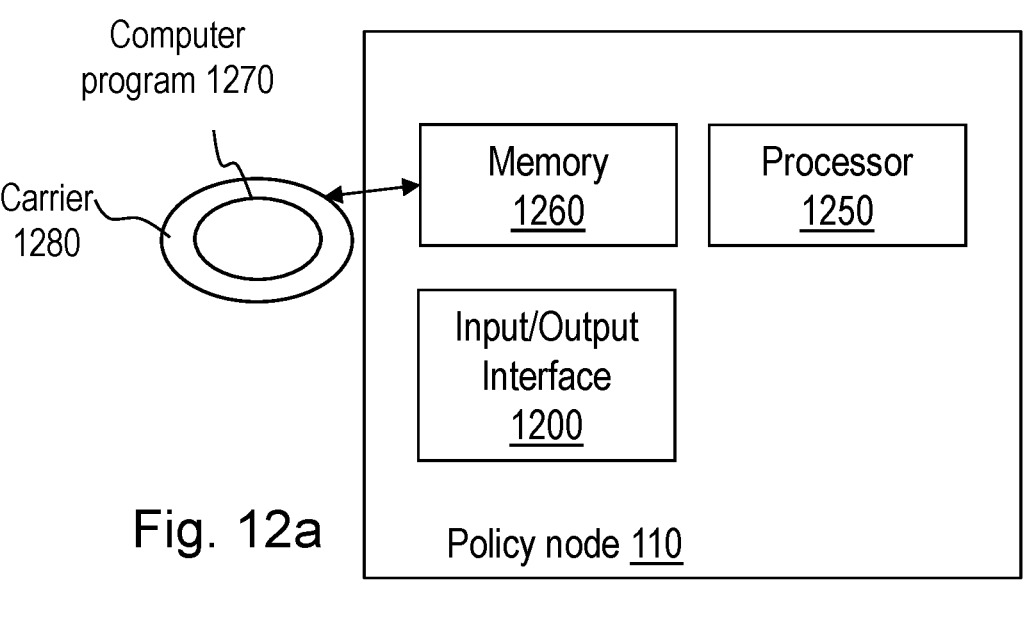
FIGS. 12 *a* and *b* are schematic block diagrams illustrating embodiments of a policy node.
Figure 12B:
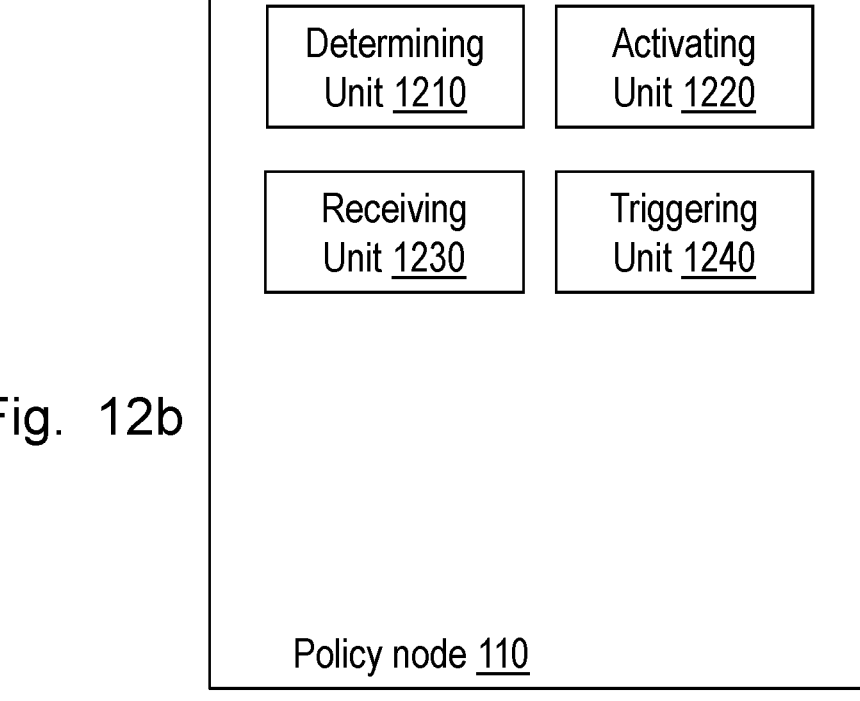

To perform the method actions, the policy node 110 may comprise an arrangement depicted in FIGS. 12a and b. The policy node 110 is configured to handle policies related to a radio device 120 in the communications network 100. The radio device 120 is adapted to support proxy server functionality.

The policy node 110 may comprise an input and output interface 1200 configured to communicate with e.g. the UE 121 and with network nodes in the communications network 100.

The policy node 110 is further configured to, e.g. by means of a determining unit 1210 in the policy node 110, during a session establishment of the radio device 120, determine that obtained policies adapted to be related to the radio device 120 comprises one or more rules. The respective one or more rules are adapted to comprise any one or more out of: An application descriptor adapted to be related to the one or more rules, and a domain descriptor adapted to be related to the one or more rules.

The policy node 110 is further configured to, e.g. by means of the determining unit 1210 in the policy node 110, determine, based on received capability information, that the radio device 120 is not aware of any or more one out of an application and a domain, and that the radio device 120 supports proxy server functionality.

The policy node 110 is further configured to, e.g. by means of an activating unit 1220 in the policy node 110, handle the policies adapted to be related to the radio device 120 by activating the proxy server 121 in the radio device 120. The proxy server 121 is activated by sending a message to the radio device 120. The message is adapted to comprise: an indication adapted to request the radio device 120 to activate the proxy server 121, the one or more rules, and a configuration adapted to related to the proxy server 121. The proxy server 121 is adapted to enable the radio device 120, even though not being application aware or domain aware, to apply the one or more rules comprised in the policies adapted to be related to the radio device 120.

The message requesting the radio device 120 to activate the proxy server 121 may be adapted to be sent using the established connection The configuration related to the proxy server 121 may be adapted to comprise any one or more out of: Certificates and encryption keys, adapted to be used by the proxy server 121.

The request message to activate the proxy server 121 may be adapted to be any one out of: A configuration request adapted to be sent directly to the radio device 120, or a policy control request message adapted to be sent to the radio device 120 via an access and mobility node 130.

The proxy server 121 may be adapted to be a MASQUE server.

The policy node 110 may further be configured to, e.g. by means of a receiving unit 1230 in the policy node 110, receive during the session establishment, a request message adapted to request the session to be established. The request message is adapted to comprise the capability information.

The policy node 110 may further be configured to, e.g. by means of the receiving unit 1230 in the policy node 110, receive from the radio device 120, a discovery response message. The discovery response message is adapted to comprise the capability information.

The capability information may be adapted to indicate any one or more out of: That the radio device 120 does not support application awareness, that the radio device 120 does not support domain awareness, and that the radio device 120 supports proxy server functionality.

The policy node 110 may further be configured to, e.g. by means of a triggering unit 1240 in the policy node 110, trigger towards the radio device 120, a discovery procedure. The discovery procedure is triggered by establishing a connection to the radio device 120 and sending a discovery request message to the radio device 120 using the established connection.

The embodiments herein may be implemented through a respective processor or one or more processors, such as the processor 1250 of a processing circuitry in the policy node 110 depicted in FIG. 12*a*, together with respective computer program code for performing the functions and actions of the embodiments herein. The program code mentioned above may also be provided as a computer program product, for instance in the form of a data carrier carrying computer program code for performing the embodiments herein when being loaded into the policy node 110. One such carrier may be in the form of a CD ROM disc. It is however feasible with other data carriers such as a memory stick. The computer program code may furthermore be provided as pure program code on a server and downloaded to the policy node 110.

The policy node 110 may further comprise a memory 1260 comprising one or more memory units. The memory policy node 110 comprises instructions executable by the processor 1250 in the policy node 110. The memory 1260 is arranged to be used to store e.g. information, messages, indications, configurations, policies, rules, communication data and applications to perform the methods herein when being executed in the policy node 110.

In some embodiments, a computer program 1270 comprises instructions, which when executed by the respective at least one processor 1250, cause the at least one processor 1250 of the policy node 110 to perform the actions above.

In some embodiments, a respective carrier 1280 comprises the respective computer program 1270, wherein the carrier 1280 is one of an electronic signal, an optical signal, an electromagnetic signal, a magnetic signal, an electric signal, a radio signal, a microwave signal, or a computer-readable storage medium.

Those skilled in the art will appreciate that the units in the policy node 110 described above may refer to a combination of analog and digital circuits, and/or one or more processors configured with software and/or firmware, e.g. stored in the policy node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 13A:
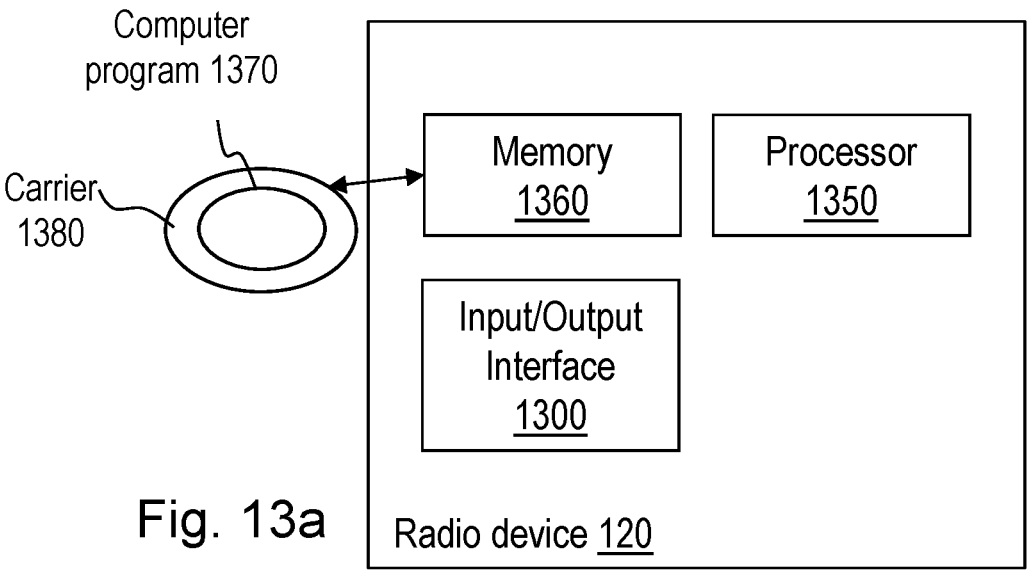
FIGS. 13 *a* and *b* are schematic block diagrams illustrating embodiments of a radio device.
Figure 13B:
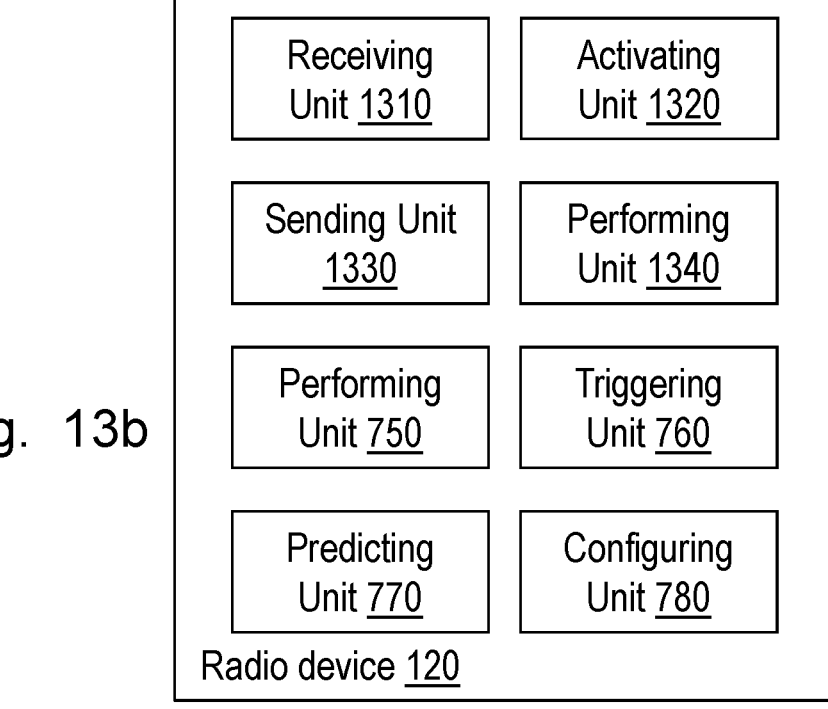

To perform the method actions, the radio device 120 may comprise an arrangement depicted in FIGS. 13*a* and *b*. The radio device 120 is configured to handle policies adapted to be related to the radio device 120 in a communications network 100. The radio device 120 is adapted to support proxy server functionality.

The radio device 120 may comprise an input and output interface 1300 configured to communicate with e.g. the UE 121 and with network nodes in the communications network 100.

The radio device 120 is further configured to, e.g. by means of a receiving unit 1310 in the radio device 120, receive, from the policy node 110, a message. The message is adapted to comprises: An indication adapted to request the radio device 120 to activate the proxy server 121, the one or more rules related to the policies, and a configuration adapted to be related to the proxy server 121.

The radio device 120 is further configured to, e.g. by means of an activating unit 1320 in the radio device 120, handle policies related to the radio device 120 by activating the proxy server 121 in the radio device 120 based on the received message. The proxy server 121 is adapted to enable the radio device 120, even though not being application aware or domain aware, to apply the one or more rules comprised in the policies adapted to be related to the radio device 120.

The configuration related to the proxy server 121 is adapted to comprise any one or more out of: Certificates and encryption keys, adapted to be used by the proxy server 121.

The message requesting the radio device 120 to activate the proxy server 121 is adapted to be any one out of: A configuration request adapted to be received directly from the policy node 110, or a policy control request message adapted to be received from policy node 110 via the access and mobility node 130.

The proxy server 121 may be adapted to be a MASQUE server.

The radio device 120 may further be configured to, e.g. by means of a sending unit 1330 in the radio device 120, send during the session establishment, a request message adapted to request the session to be established. The request message is adapted to comprise the capability information related to the radio device 120.

The radio device 120 may further be configured to, e.g. by means of the sending unit 1330 in the radio device 120, send to the policy node 110, a discovery response message. The discovery response message is adapted to comprise the capability information related to the radio device 120.

The capability information related to the radio device 120 is adapted to indicate any one or more out of: that the radio device 120 does not support application awareness, that the radio device 120 does not support domain awareness, and that the radio device 120 supports proxy server functionality.

The radio device 120 may further be configured to, e.g. by means of a performing unit 1340 in the radio device 120, perform a discovery procedure triggered by the policy node 110. The discovery procedure is performed by establishing the connection to the policy node 110 and receiving a discovery request message from the policy node 110 using the established connection.

The embodiments herein may be implemented through a respective processor or one or more processors, such as the processor 1350 of a processing circuitry in the radio device 120 depicted in FIG. 13*a*, together with respective computer program code for performing the functions and actions of the embodiments herein. The program code mentioned above may also be provided as a computer program product, for instance in the form of a data carrier carrying computer program code for performing the embodiments herein when being loaded into the radio device 120. One such carrier may be in the form of a CD ROM disc. It is however feasible with other data carriers such as a memory stick. The computer program code may furthermore be provided as pure program code on a server and downloaded to the radio device 120.

The radio device 120 may further comprise a memory 1360 comprising one or more memory units. The memory 1360 comprises instructions executable by the processor 1350 in the radio device 120. The memory 1360 is arranged to be used to store e.g. information, messages, indications, configurations, policies, rules, communication data and applications to perform the methods herein when being executed in the radio device 120.

In some embodiments, a computer program 1370 comprises instructions, which when executed by the respective at least one processor 1350, cause the at least one processor 1350 of the radio device 120 to perform the actions above.

In some embodiments, a respective carrier 1380 comprises the respective computer program 1370, wherein the carrier 1380 is one of an electronic signal, an optical signal, an electromagnetic signal, a magnetic signal, an electric signal, a radio signal, a microwave signal, or a computer-readable storage medium.

Those skilled in the art will appreciate that the units in the radio device 120 described above may refer to a combination of analog and digital circuits, and/or one or more processors configured with software and/or firmware, e.g. stored in the radio device 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 14:
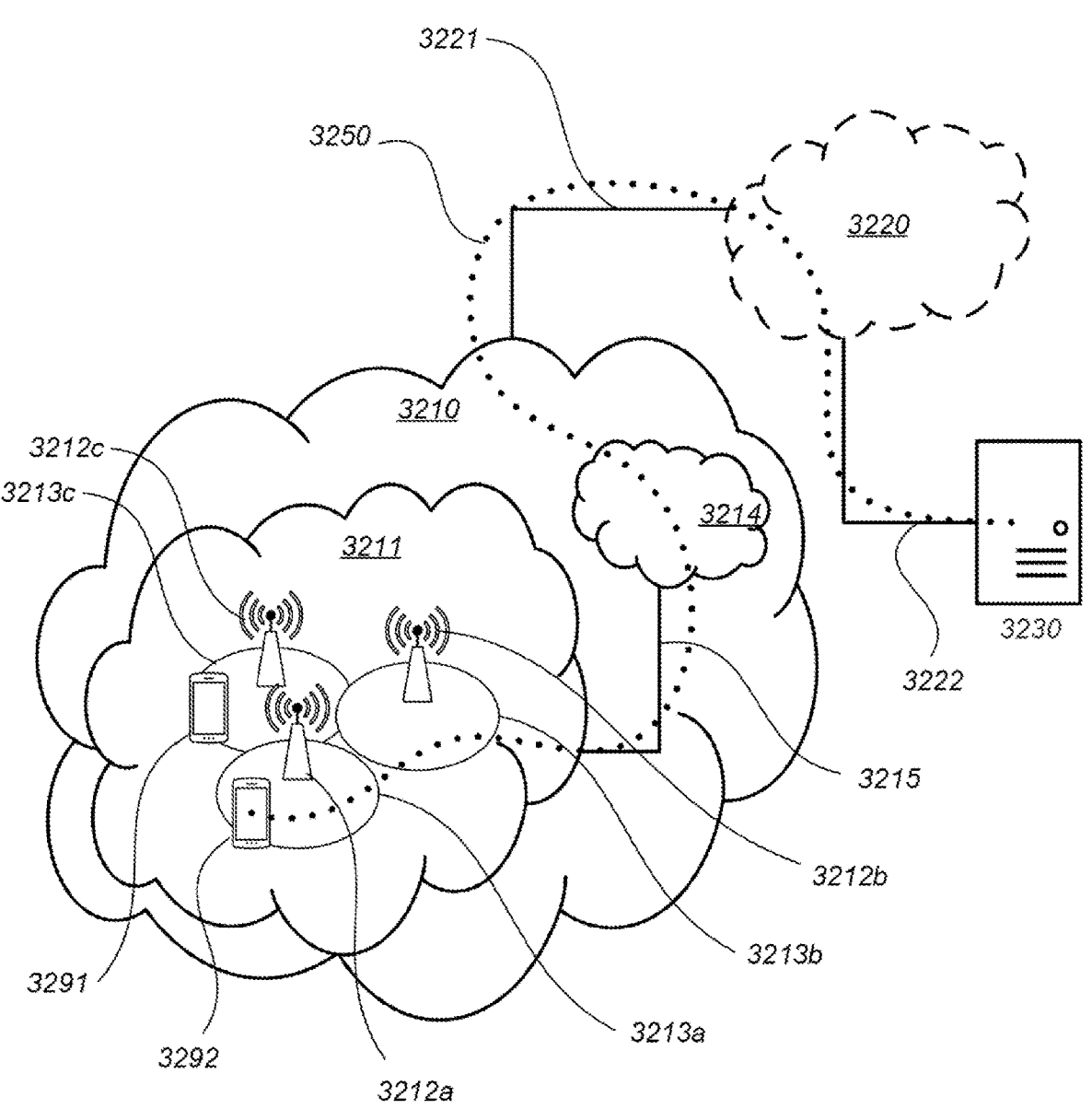
FIG. 14 schematically illustrates a telecommunication network connected via an intermediate network to a host computer.

With reference to FIG. 14, in accordance with an embodiment, a communication system includes a telecommunication network 3210, such as a 3GPP-type cellular network, which comprises an access network 3211, such as a radio access network, and a core network 3214. The core network 3214 may e.g. comprise the policy node 110. The access network 3211 comprises a plurality of base stations 3212*a*, 3212*b*, 3212*c*, e.g. the base station 105, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as the radio device 120 and/or a Non-AP STA 3291 located in coverage area 3213*c* is configured to wirelessly connect to, or be paged by, the corresponding base station 3212*c*. A second UE 3292 such as the and/or client device 125 and/or a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to setup and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown)

adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to setup and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

Figure 15:
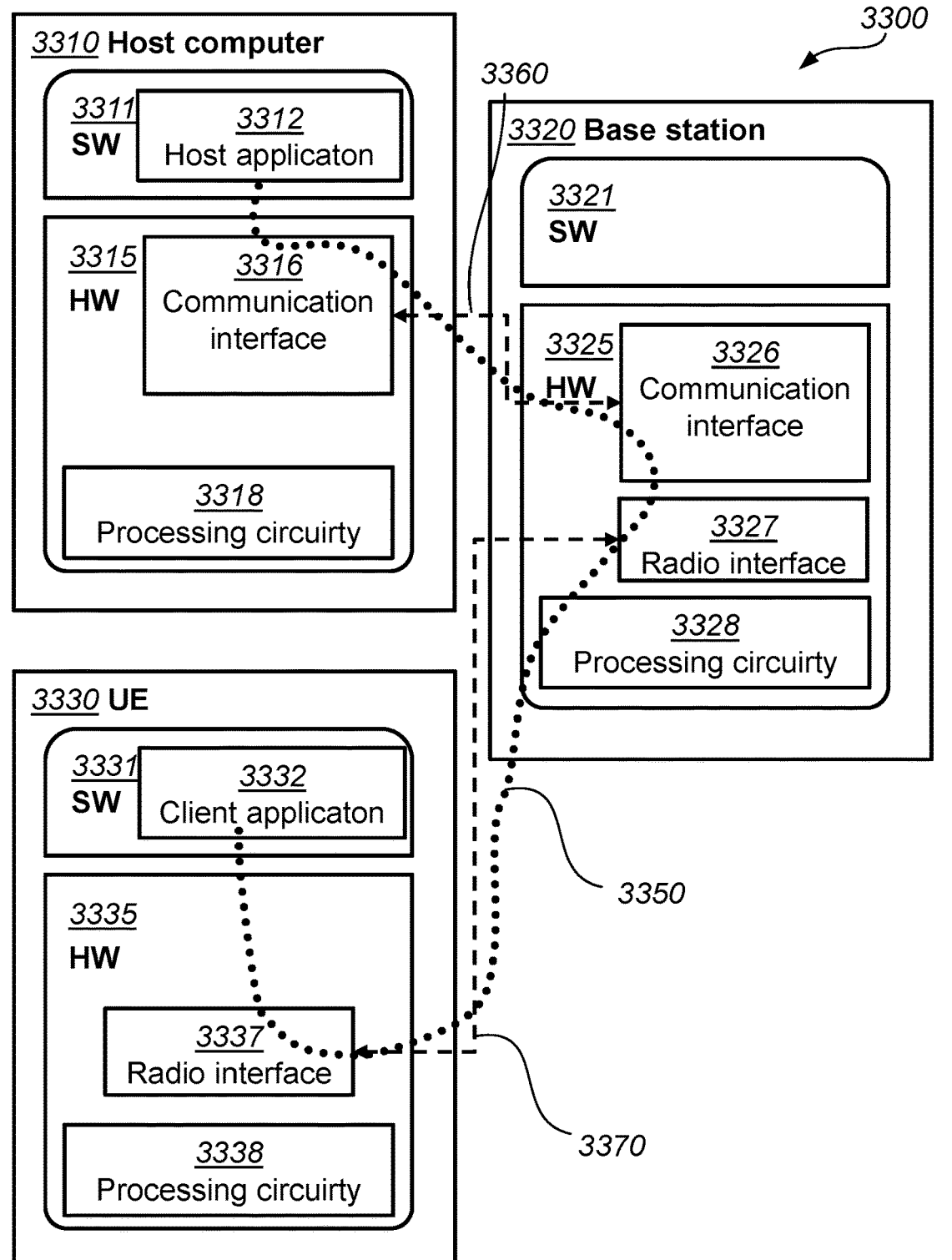
FIG. 15 is a generalized block diagram of a host computer communicating via a base station with a user equipment over a partially wireless connection.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 16, 17:
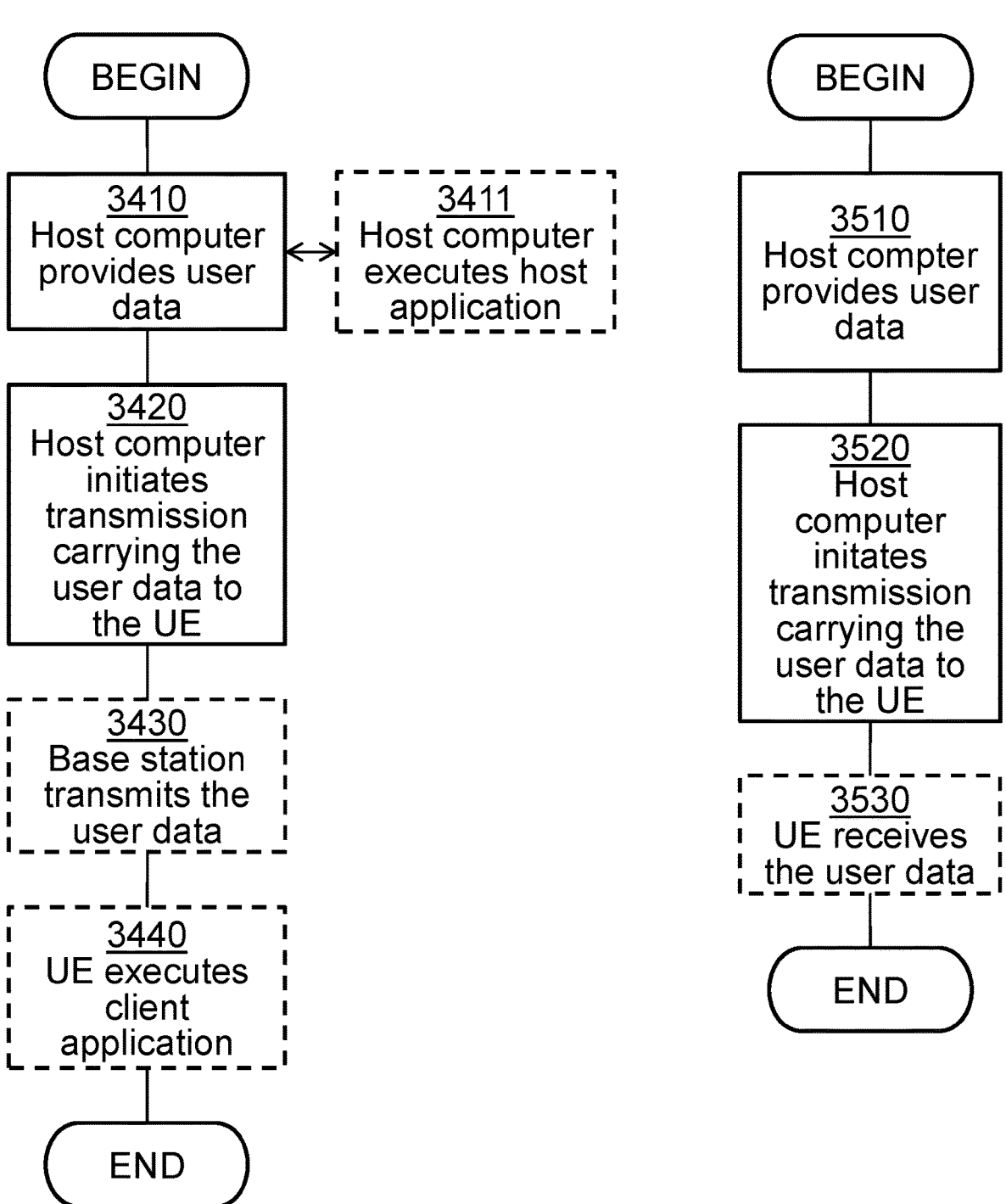

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 18 will be included in this section. In an optional first step 3610 of the method, the UE receives input data provided by the host computer. Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station such as an AP STA, and a UE such as a Non-AP STA which may be those described with reference to FIG. 14 and FIG. 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a policy node for handling policies related to a radio device in a communications network, the radio device supporting proxy server functionality, the method comprising:

during a session establishment of the radio device, determining that obtained policies related to the radio device comprises one or more rules, wherein the respective one or more rules comprises any one or more out of:

an application descriptor related to the one or more rules, and a domain descriptor related to the one or more rules, based on received capability information, that the radio device is not aware of any one or more out of an application and a domain, and that the radio device supports proxy server functionality, handling the policies related to the radio device by activating a proxy server in the radio device by sending a message to the radio device, the message comprising:

an indication requesting the radio device to activate the proxy server, the one or more rules, and a configuration related to the proxy server, which proxy server enables the radio device, even though not being application aware or domain aware, to apply the one or more rules comprised in the policies related to the radio device.

2. The method according to claim 1, further comprising:

receiving during the session establishment, a request message requesting the session to be established, the request message comprising the capability information.

3. The method according to claim 1, further comprising:

triggering towards the radio device, a discovery procedure by establishing a connection to the radio device and sending a discovery request message to the radio device using the established connection, receiving from the radio device, a discovery response message, which discovery response message comprises the capability information, and wherein the message requesting the radio device to activate the proxy server is sent using the established connection.

4. The method according to claim 1, wherein the capability information indicates any one or more out of:

that the radio device does supports application awareness, that the radio device does not support domain awareness, and that the radio device supports proxy server functionality.

5. The method according to claim 1, wherein the configuration related to the proxy server comprises any one or more out of:

certificates, and encryption keys, to be used by the proxy server.

6. The method according to claim 1, wherein the request message to activate the proxy server is any one out of:

a configuration request sent directly to the radio device, or a policy control request message sent to the radio device via an access and mobility node.

7. The method according to claim 1, wherein the proxy server is a MASQUE server.

8. A non-transitory computer-readable storage medium comprising instructions which, when executed by a computer, cause the computer to carry out the steps of the method of claim 1.

9. A method performed by a radio device for handling policies related to the radio device in a communications network, the radio device supporting proxy server functionality, the method comprising:

receiving, from a policy node, a message, the message comprising:

an indication requesting the radio device to activate the proxy server, one or more rules comprised in the polices, and a configuration related to the proxy server, handling policies related to the radio device by activating the proxy server in the radio device based on the received message, which proxy server enables the radio device, even though not being application aware or domain aware, to apply the one or more rules comprised in the policies related to the radio device.

10. The method according to claim 9, further comprising:

during the session establishment, sending a request message requesting the session to be established, the request message comprising capability information related to the radio device.

11. The method according to claim 10, further comprising:

performing a discovery procedure triggered by the policy node by establishing a connection to the policy node and receiving a discovery request message from the policy node using the established connection, and sending to the policy node, a discovery response message, which discovery response message comprises the capability information related to the radio device.

12. The method according to claim 10, wherein the capability information related to the radio device indicates any one or more out of:

that the radio device does supports application awareness, that the radio device does not support domain awareness, and that the radio device supports proxy server functionality.

13. The method according to claim 10, wherein the configuration related to the proxy server comprises any one or more out of:

certificates, and encryption keys, to be used by the proxy server.

14. The method according to claim 10, wherein the message requesting the radio device to activate the proxy server is any one out of:

a configuration request received directly from the policy node, or a policy control request message received from policy node via an access and mobility node.

15. The method according to claim 10, wherein the proxy server is a MASQUE server.

16. A non-transitory computer-readable storage medium comprising instructions which, when executed by a computer, cause the computer to carry out the steps of the method of claim 9.

17. A policy node configured to handle policies related to a radio device in a communications network, the radio device being adapted to support proxy server functionality, the policy node comprising processing circuitry and a memory, the processing circuitry operable to:

during a session establishment of the radio device, determine that obtained policies adapted to be related to the radio device comprises one or more rules, wherein the respective one or more rules are adapted to comprise any one or more out of:

an application descriptor adapted to be related to the one or more rules, and a domain descriptor adapted to be related to the one or more rules, determine, based on received capability information, that the radio device is not aware of any or more one out of an application and a domain, and that the radio device supports proxy server functionality, handle the policies adapted to be related to the radio device by activating a proxy server in the radio device by sending a message to the radio device, the message being adapted to comprise:

an indication adapted to request the radio device to activate the proxy server, the one or more rules, and a configuration adapted to related to the proxy server, which proxy server is adapted to enable the radio device, even though not being application aware or domain aware, to apply the one or more rules comprised in the policies adapted to be related to the radio device.

18. The policy node according to claim 17, the processing circuitry further operable to:

receive during the session establishment, a request message adapted to request the session to be established, the request message adapted to comprise the capability information.

19. A radio device configured to handle policies adapted to be related to the radio device in a communications network, the radio device being adapted to support proxy server functionality, the radio device comprising processing circuitry and a memory, the processing circuitry operable to:

receive, from a policy node, a message, the message being adapted to comprising:

an indication adapted to request the radio device to activate the proxy server, one or more rules comprised in the policies, and a configuration adapted to be related to the proxy server, handle policies related to the radio device by activating the proxy server in the radio device based on the received message, which proxy server is adapted to enable the radio device, even though not being application aware or domain aware, to apply the one or more rules comprised in the policies adapted to be related to the radio device.

20. The radio device according to claim 19, the processing circuitry further operable to:

send during the session establishment, a request message adapted to request the session to be established, the request message adapted to comprise capability information related to the radio device.

* * * * *